(12) United States Patent
Bushman et al.

(10) Patent No.: US 9,372,998 B2
(45) Date of Patent: Jun. 21, 2016

(54) CLIENT-SIDE ENCRYPTION IN A DEDUPLICATION BACKUP SYSTEM

(71) Applicant: STORAGECRAFT TECHNOLOGY CORPORATION, Draper, UT (US)

(72) Inventors: Nathan S. Bushman, Pleasant Grove, UT (US); Dudley Melvin Irish, Salt Lake City, UT (US); Jeffrey Dale Blair, American Fork, UT (US); Adam Julian Mensel, Salt Lake City, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 14/508,654

(22) Filed: Oct. 7, 2014

(65) Prior Publication Data

US 2016/0098568 A1    Apr. 7, 2016

(51) Int. Cl.
*G06F 21/00* (2013.01)
*G06F 21/60* (2013.01)
*G06F 17/30* (2006.01)
*G06F 11/14* (2006.01)

(52) U.S. Cl.
CPC .......... *G06F 21/602* (2013.01); *G06F 11/1446* (2013.01); *G06F 17/30979* (2013.01)

(58) Field of Classification Search
CPC .............. G06F 21/602; G06F 11/1446; G06F 17/30979
USPC ........................................................... 380/29
See application file for complete search history.

(56) References Cited

U.S. PATENT DOCUMENTS 6,330,557 B1 * 12/2001 Chauhan
8,199,911 B1 *  6/2012 Tsaur et al. ...................... 380/44
8,401,185 B1 *  3/2013 Telang ............................ 380/44

* cited by examiner

*Primary Examiner* — John B King
(74) *Attorney, Agent, or Firm* — Maschoff Brennan

(57) ABSTRACT

Client-side encryption in a deduplication backup system. In one example embodiment, a method includes a backup phase in which various steps are performed for each allocated plain text block stored in a source storage. One step includes hashing, using a first cryptographic hash function, the plain text block to generate a first hash. Another step includes hashing, using a second cryptographic hash function, the first hash to generate a second hash. Another step includes searching a key-value table of a deduplication storage to determine whether the second hash matches any key in the key-value table. Another step includes, upon determining that the second hash does not match any key in the key-value table, encrypting, using an encrypt/decrypt function, the plain text block using the first hash as an encryption password and inserting a key-value pair into the key-value table with the key being the second hash and the value being the encrypted block.

20 Claims, 13 Drawing Sheets

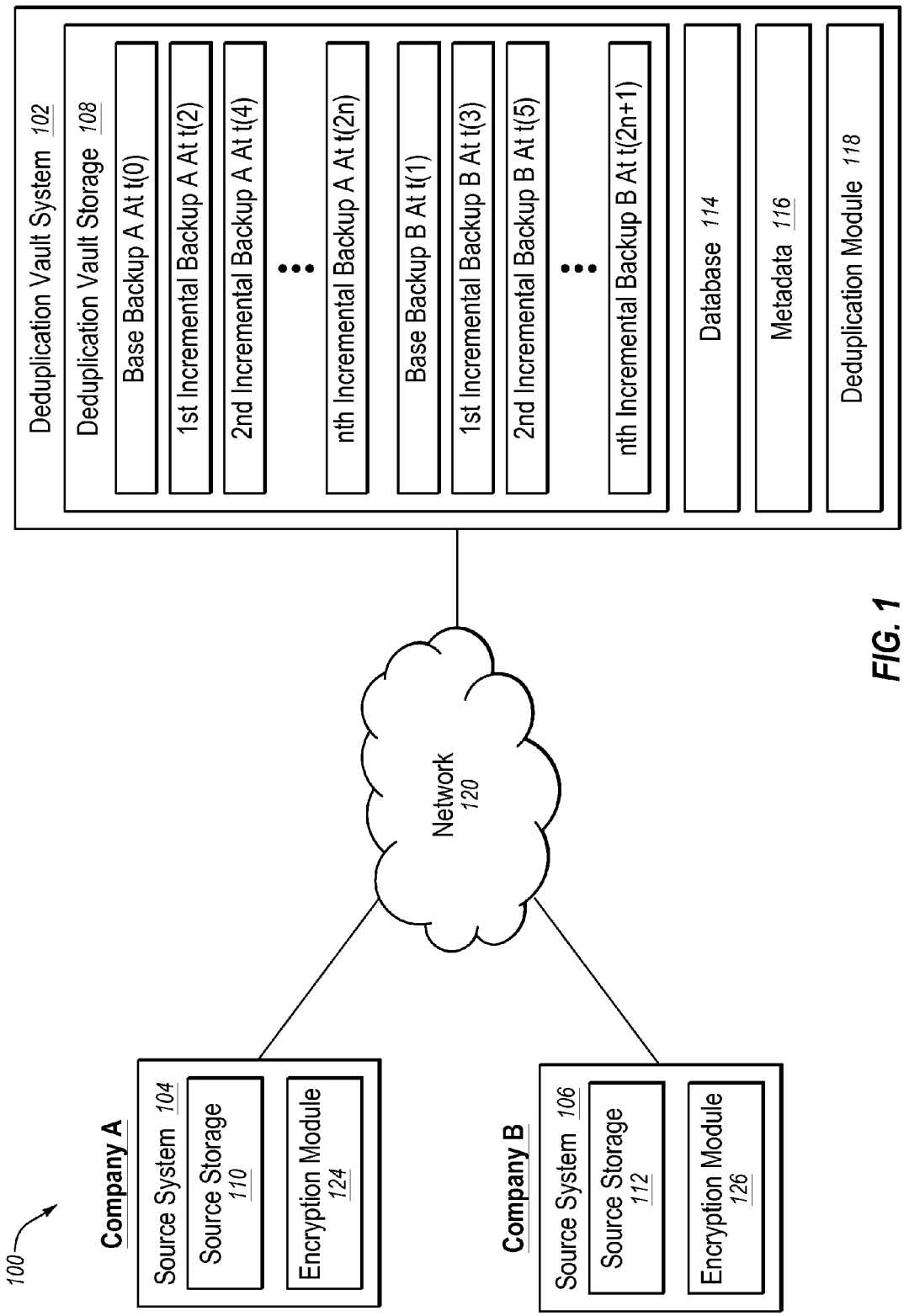

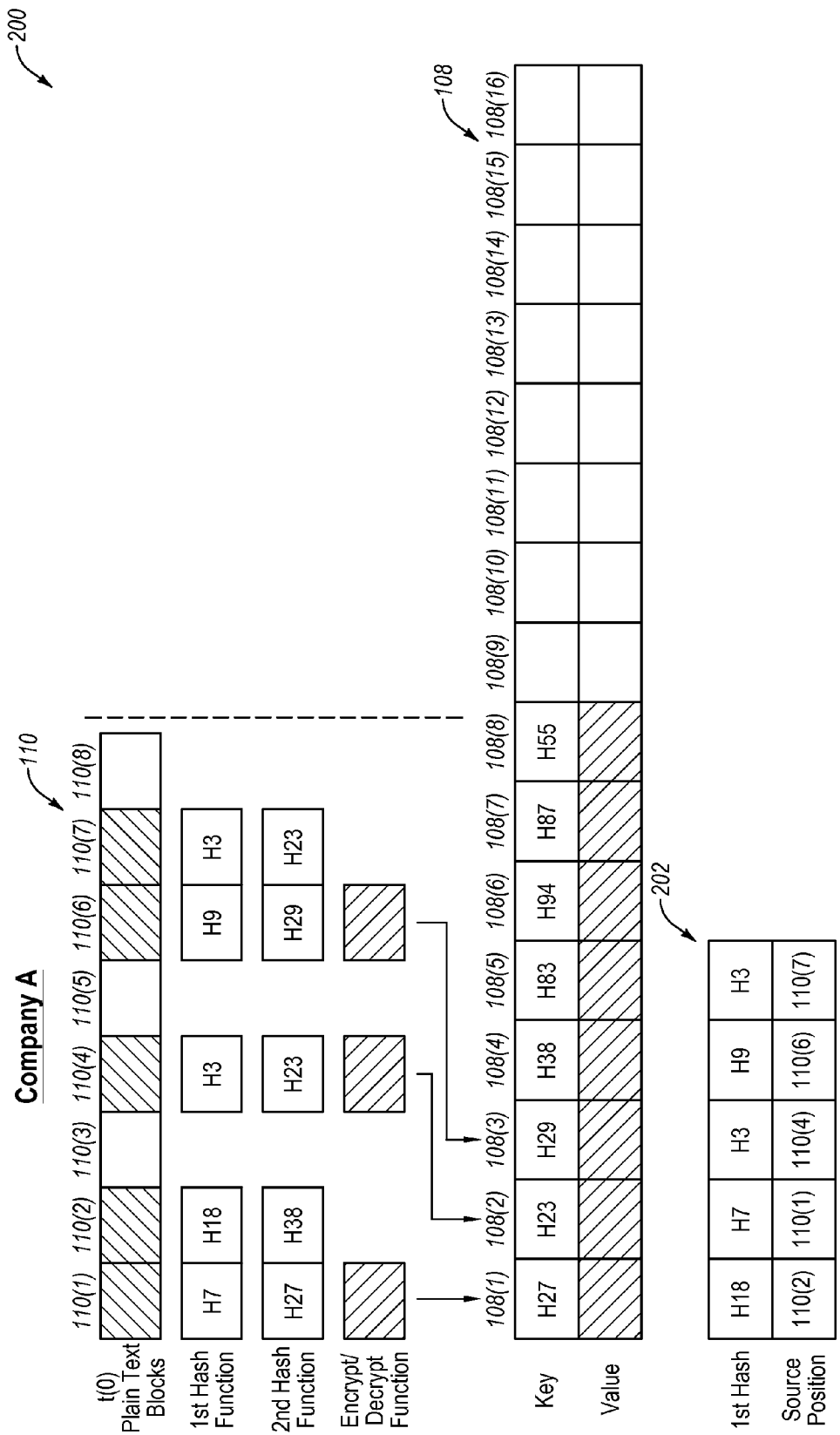

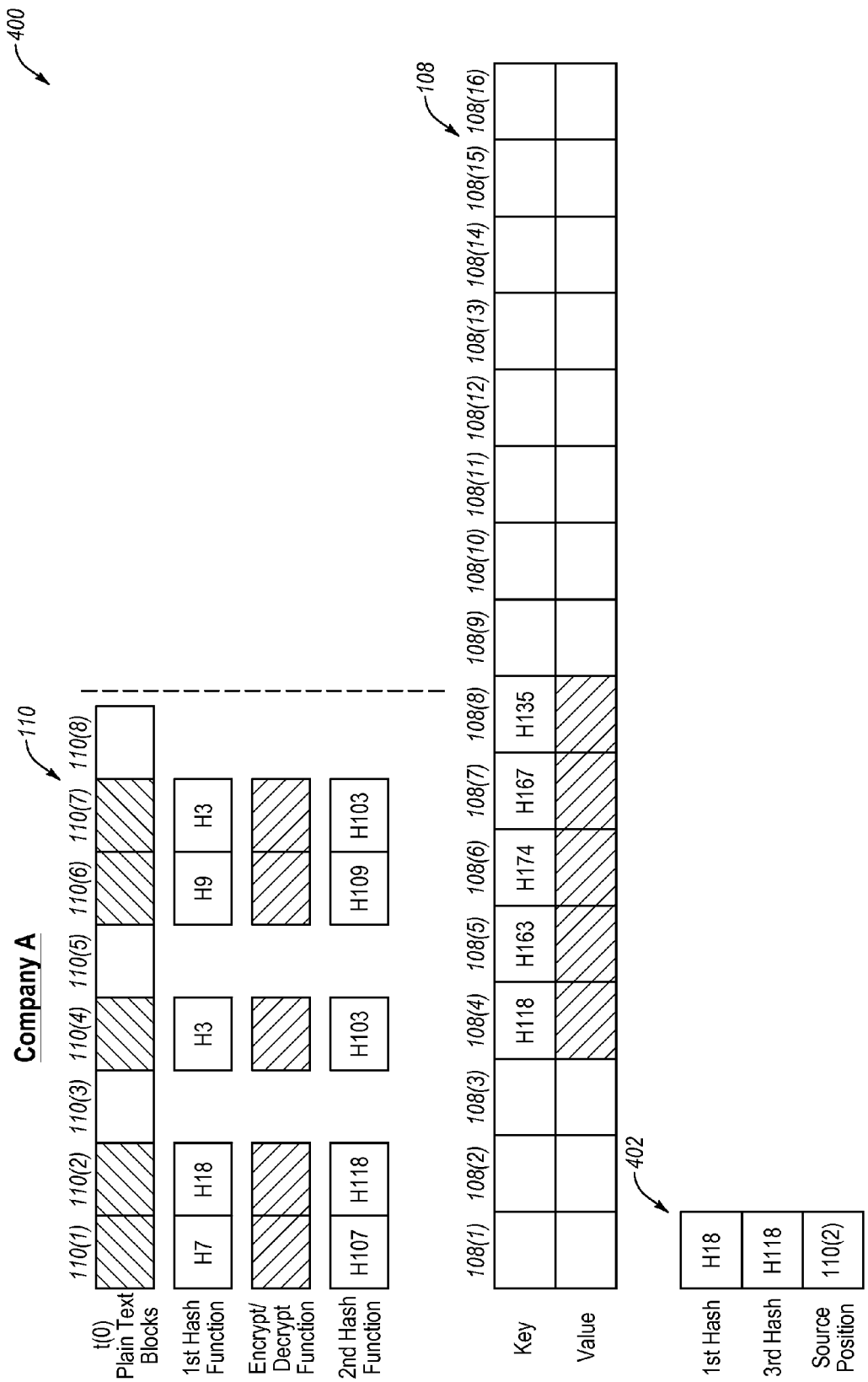

CLIENT-SIDE ENCRYPTION IN A DEDUPLICATION BACKUP SYSTEM

FIELD

The embodiments disclosed herein relate to client-side encryption in a deduplication backup system.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and free blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks, since free blocks are not generally backed up.

Image backup can be relatively fast compared to file backup because reliance on the file system is minimized. An image backup can also be relatively fast compared to a file backup because seeking during image backup may be reduced. In particular, during image backup, blocks are generally read sequentially with relatively limited seeking. In contrast, during file backup, blocks that make up individual files may be scattered in the source storage, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® 8 Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of backup storage and increase the bandwidth overhead of transporting blocks to the backup storage.

While this redundancy problem can be mitigated to a certain extent through the use of a deduplication vault, a standard deduplication vault, in order to deduplicate the blocks of a storage, must first receive the blocks from the computer system of the storage in unencrypted form, after which the deduplication vault will store the block if it is unique, or if the vault supports encryption it will encrypt and store the encrypted block if it is unique. In this way the standard deduplication vault will support deduplication of blocks from multiple systems. However, as the standard deduplication vault requires, at least temporarily, access to the unencrypted blocks, this provides an opportunity for these blocks to be compromised should the security of the deduplication vault be compromised or faulty. For this reason, encrypted deduplication vaults have been developed in which each block is encrypted by the source computer system prior to backing up the block into the encrypted deduplication vault, such that the deduplication vault, without being provided the decryption key, is unable to decrypt the encrypted blocks.

While encrypted deduplication vaults have alleviated the concerns regarding unauthorized access to sensitive blocks, a common problem encountered during backup into an encrypted deduplication vault is that encrypted blocks may not be capable of deduplication across different clients. In particular, while the blocks that make up a commercial operating system or a standard application may be identical in their plain text form, encryption of two identical plain text blocks can result in differences in the encrypted versions of the blocks, as each client is likely to use its own unique encryption password. Thus, even if an identical plain text block is backed up across different source storages, the encrypted block that is actually stored in the deduplication vault may be different for each source storage, resulting in the identical plain text block being stored multiple times in different encrypted forms. As a result, the benefits of deduplication may be lost even when identical blocks are being backed up because different source systems may encrypt identical blocks differently, particularly if different encryption passwords are used on the different source systems.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to client-side encryption in a deduplication backup system.

The example methods disclosed herein may be employed to encrypt plain-text blocks at a source system (i.e., a client) prior to sending the blocks to a deduplication vault system. This client-side encryption reduces the potential for an unauthorized user to access the original plain-text blocks even where the unauthorized user has access to the deduplication vault system. Further, the example methods disclosed herein may also be employed to encrypt plain-text blocks in such a way that only a single encrypted block is stored in the deduplication vault storage for each unique plain-text block that is backed-up across multiple source storages of multiple clients. Thus, the example methods disclosed herein employ client-side encryption with deduplication which enables sensitive blocks to remain secure within the deduplication vault storage even while redundancy within and across multiple source storages is reduced or eliminated. This may increase the number of blocks from a source storage that are already duplicated in the deduplication vault storage at the time that a backup of the source storage is created in the deduplication vault storage, thereby decreasing the number of blocks that must be copied from the source storage to the deduplication vault storage. Decreasing the number of blocks that must be copied from the source storage to the deduplication vault storage during the creation of a backup may result in decreased bandwidth overhead of transporting blocks to the deduplication vault storage and increased efficiency and speed during the creation of each backup.

In one example embodiment, a method for client-side encryption in a deduplication backup system includes a backup phase in which various steps are performed for each allocated plain text block stored in a source storage at a point in time. One step includes hashing, using a first cryptographic hash function, the plain text block to generate a first hash. Another step includes hashing, using a second cryptographic hash function, the first hash to generate a second hash. Another step includes searching a key-value table of a deduplication storage to determine whether the second hash matches any key in the key-value table. In this step, each key-value pair in the key-value table includes a key that is a hash and a value that is an encrypted block. Another step includes, upon determining that the second hash does not match any key in the key-value table, encrypting, using an encrypt/decrypt function, the plain text block using the first hash as an encryption password and inserting a key-value pair into the key-value table with the key being the second hash and the value being the encrypted block. Another step includes inserting an entry into an image map corresponding to the source storage that includes the first hash and a position of the plain text block as stored in the source storage.

In another example embodiment, a method for client-side encryption in a deduplication backup system includes a backup phase in which various steps are performed for each allocated plain text block stored in a source storage at a point in time. One step includes hashing, using a first cryptographic hash function, the plain text block to generate a first hash. Another step includes encrypting, using an encrypt/decrypt function, the plain text block using the first hash as an encryption password. Another step includes hashing, using a second cryptographic hash function, the encrypted block to generate a third hash. Another step includes searching a key-value table of a deduplication storage to determine whether the third hash matches any key in the key-value table. In this step, each key-value pair in the key-value table includes a key that is a hash and a value that is an encrypted block. Another step includes, upon determining that the third hash does not match any key in the key-value table, inserting a key-value pair into the key-value table with the key being the third hash and the value being the encrypted block. Another step includes inserting an entry into an image map corresponding to the source storage that includes the first hash, the third hash, and a position of the plain text block as stored in the source storage.

It is to be understood that both the foregoing general description and the following detailed description are exemplary and explanatory and are not restrictive of the invention as claimed.

BRIEF DESCRIPTION OF THE DRAWINGS

Example embodiments will be described and explained with additional specificity and detail through the use of the accompanying drawings in which:

FIG. 1 is a schematic block diagram illustrating an example deduplication backup system;

FIGS. 2A-2D are schematic diagrams illustrating client-side encryption in a deduplication backup system;

FIGS. 4A-4D are schematic diagrams illustrating client-side encryption in a deduplication backup system.

DESCRIPTION OF EMBODIMENTS

Figure 2A:
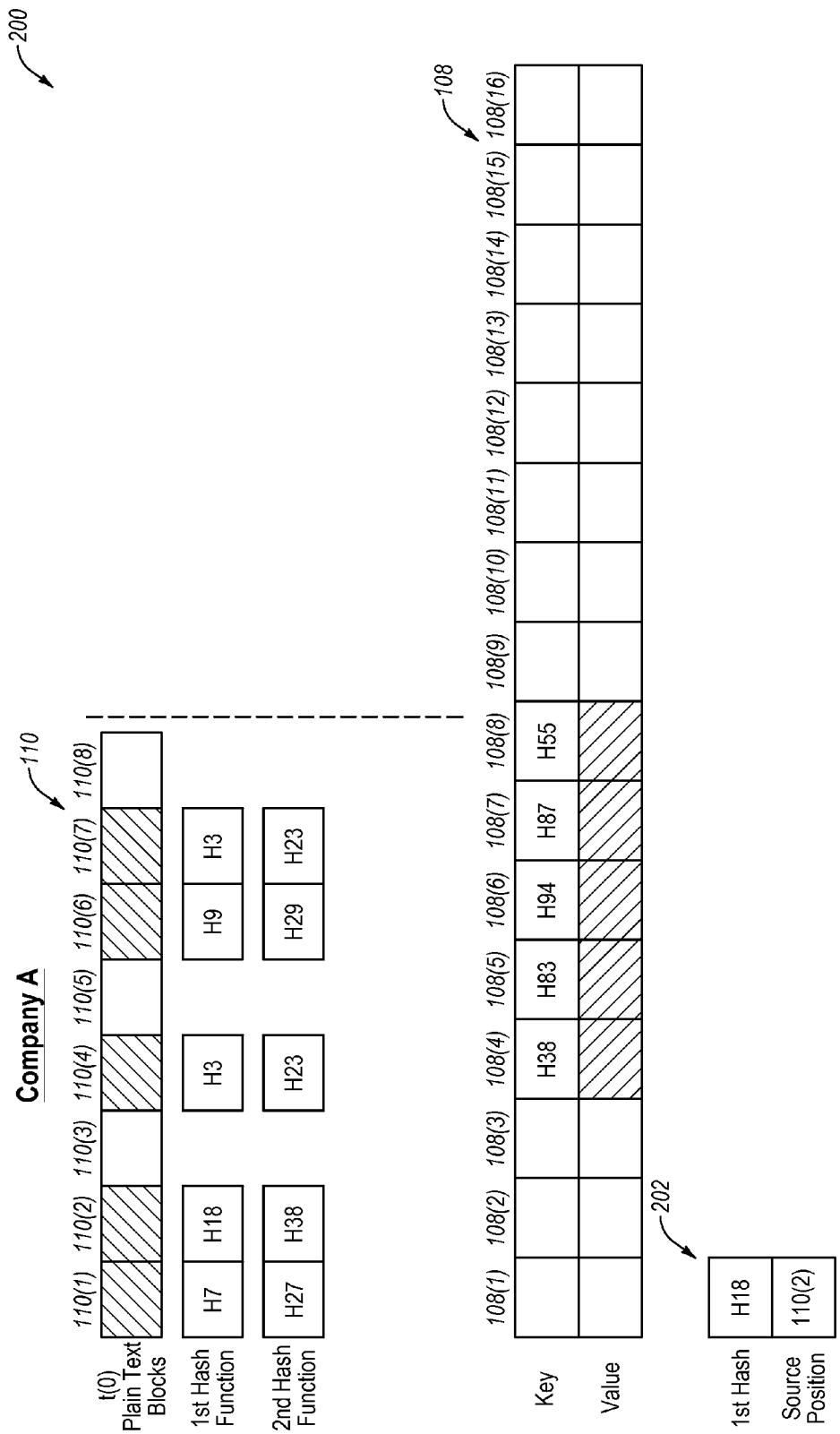

The term "storage" as used herein refers to computer-readable media, or some logical portion thereof such as a volume, capable of storing data in blocks. The term "block" as used herein refers to a fixed-length discrete sequence of bits. In some example embodiments, the size of each block may be configured to match the standard sector size of a file system of a storage on which the block is stored. For example, the size of each block may be 512 bytes (4096 bits) where 512 bytes is the size of a standard sector. The term "allocated block" as used herein refers to a block in a storage that is currently tracked as storing data by a file system of the storage. The term "free block" as used herein refers to a block in a storage that is not currently employed nor tracked as storing data by a file system of the storage. The term "backup," when used herein as a noun, refers to a copy or copies of one or more blocks from a storage. The term "base backup" as used herein refers to a base backup of a storage that includes at least a copy of each unique allocated block of the storage at a point in time such that the base backup can be restored on its own to recreate the state of the storage at the point in time, without being dependent on any other backup. A "base backup" may also include nonunique allocated blocks and free blocks of the storage at the point in time. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial base backup of the storage, can be restored together to recreate the state of desired blocks of the storage at the subsequent point in time. The term "modified block" as used herein refers to a block that was modified either because the block was previously-allocated and changed or because the block was modified by being newly-allocated. An "incremental backup" may also include nonunique allocated blocks and free blocks of the storage that were modified between the previous point in time and the subsequent point in time. Only "unique allocated blocks" may be included in a "base backup" or an "incremental backup" where only a single copy of multiple duplicate allocated blocks (i.e., nonunique allocated blocks) is backed up to reduce the size of the backup. A "base backup" or an "incremental backup" may exclude certain undesired allocated blocks such as blocks belonging to files whose contents are not necessary for restoration purposes, such as virtual memory pagination files and machine hibernation state files.

FIG. 1 is a schematic block diagram illustrating an example deduplication backup system 100. As disclosed in FIG. 1, the example deduplication backup system 100 includes a deduplication vault system 102, a source system 104 of Company A, and a source system 106 of Company B. Company A may be a competitor of Company B, such that users of the source system 104 of Company A would not be authorized to access sensitive data stored in the source system 106 of Company B, and vice-versa. The systems 102, 104, and 106 include storages 108, 110, and 112, respectively.

The deduplication vault storage 108 stores a base backup A and multiple incremental backups A that have been created of the source storage 110 to represent the states of the source storage 110 at various points in time. For example, the base backup A represents the state of the source storage 110 at time t(0), the 1st incremental backup A represents the state of the source storage 110 at time t(2), the 2nd incremental backup A represents the state of the source storage 110 at time t(4), and the nth incremental backup A represents the state of the source storage 110 at time t(2n). Similarly, the deduplication vault storage 108 stores a base backup B and multiple incremental backups B that have been created of the source storage 112 to represent the state of the source storage 112 at various points in time. For example, the base backup B represents the state of the source storage 112 at time t(1), the 1st incremental backup B represents the state of the source storage 112 at time t(3), the 2nd incremental backup B represents the state of the source storage 112 at time t(5), and the nth incremental backup B represents the state of the source storage 112 at time t(2n+1). The deduplication vault system 102 also includes a database 114, metadata 116, and a deduplication module 118. The source systems 104 and 106 also include encryption modules 124 and 126, respectively. The source systems 104 and 106 are able to communicate with the deduplication vault system 102 over a network 120.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backups stored in the deduplication vault storage 108 may be created by the deduplication module 118. For example, the deduplication module 118 may be configured to execute computer instructions to perform image backup operations of creating a base backup and multiple incremental backups of the source storages 110 and of the source storage 112. It is noted that these image backups may initially be created on the source systems 104 and 106 and then copied to the deduplication vault system 102.

For example, the base backup A may be created to capture the state of the source storage 110 at time t(0). This image backup operation may include the deduplication module 118 copying all allocated blocks of the source storage 110 as allocated at time t(0) and storing the allocated blocks in the deduplication vault storage 108. The state of the source storage 110 at time t(0) may be captured using snapshot technology in order to capture the blocks stored in the source storage 110 at time t(0) without interrupting other processes, thus avoiding downtime of the source storage 110. The base backup A may be very large depending on the size of the source storage 110 and the number of allocated blocks at time t(0). As a result, the base backup A may take a relatively long time to create and consume a relatively large amount of space in the duplication vault storage 108, depending on how many of the blocks included in the base backup A were already duplicated in the duplication vault storage 108 prior to the creation of the base backup A.

Next, the 1st and 2nd incremental backups A may be created to capture the states of the source storage 110 at times t(2) and t(4), respectively. This may include copying only modified allocated blocks of the source storage 110 present at time t(2) and storing the modified allocated blocks in the deduplication vault storage 108, then later copying only modified allocated blocks of the source storage 110 present at time t(4) and storing the modified allocated blocks in the deduplication vault storage 108. The states of the source storage 110 at times t(2) and t(4) may also be captured using snapshot technology, thus avoiding downtime of the source storage 110. Each incremental backup A may include only those allocated blocks from the source storage 110 that were modified after the time of the previous backup. Thus, the 1st incremental backup may include only those allocated blocks from the source storage 110 that were modified between time t(0) and time t(2), and the 2nd incremental backup may include only those allocated blocks from the source storage 110 that were modified between time t(2) and time t(4). In general, as compared to the base backup A, each incremental backup A may take a relatively short time to create and consume a relatively small storage space in the deduplication vault storage 108, depending on how many of the blocks included in the base backup A and the 1st and 2nd incremental backups A were already duplicated in the duplication vault storage 108 prior to the creation of the base backup A.

Finally, an nth incremental backup A may be created to capture the state of the source storage 110 at time t(2n). This may include copying only modified allocated blocks of the source storage 110 present at time t(2n), using snapshot technology, and storing the modified allocated blocks in the deduplication vault storage 108. The nth incremental backup A may include only those allocated blocks from the source storage 110 that were modified between time t(2n) and the point in time of the backup of the source storage 110 that occurred just prior to the nth incremental backup A at time t(2n).

The base backup B and the 1st, 2nd, and nth incremental backups B may be created in a similar manner as the creation of the base backup A and the 1st, 2nd, and nth incremental backups A, only instead of being created to represent the states at times t(0), t(2), t(4), and t(2n), the base backup B and the 1st, 2nd, and nth incremental backups B are created to represent the states at times t(1), t(3), t(5), and t(2n+1). As disclosed herein, a time with a label t(x) is at least as late in time as a time with a label t(x−1).

Therefore, incremental backups may be created on an ongoing basis. The frequency of creating new incremental backups may be altered as desired in order to adjust the amount of data that will be lost should the source storage 110 or 112 experience corruption of its stored blocks or become unavailable at any given point in time. The blocks from the source storage 110 or 112 can be restored to the state at the point in time of a particular incremental backup by applying the image backups to a restore storage from oldest to newest, namely, first applying the base backup and then applying each successive incremental backup up to the particular incremental backup. Alternatively, the blocks from the source storage 110 or 112 can be restored to the state at the point in time of a particular incremental backup by applying the image backups to a restore storage concurrently, namely, concurrently applying the base backup and each successive incremental backup up to the particular incremental backup. The restore storage may be the source storage 110 or 112 or some other storage.

Although only allocated blocks are included in the example base and incremental backups discussed above, it is understood that in alternative implementations both allocated and free blocks may be backed up during the creation of a base backup or an incremental backup. This is typically done for forensic purposes, because the contents of free blocks can be interesting where the free blocks contain data from a previous point in time when the blocks were in use and allocated. Therefore, the creation of base backups and incremental backups as disclosed herein is not limited to allocated blocks but may also include free blocks.

Further, although only base backups and incremental backups are discussed above, it is understood that the source storage 110 or 112 may instead be backed up by creating a base backup and one or more decremental image backups. Decremental backups are created by initially creating a base backup to capture the state at an initial point in time, then updating the base backup to capture the state at a subsequent point in time by modifying only those blocks in the base backup that changed between the initial and subsequent points in time, and by adding to the base backup copies of any blocks newly allocated between the initial and subsequent point in time. Prior to the updating of the base backup, however, the original blocks in the base backup that correspond to the changed blocks are copied to a decremental backup, thus enabling restoration of the source storage 110 or 112 at the initial point in time (by restoring the updated base backup and then restoring the decremental backup or by concurrently restoring the updated base backup and the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the methods disclosed herein are not limited to encrypting base and incremental backups, but may also include encrypting base and decremental backups.

The database 114 and the metadata 116 may be employed to track information related to the source storages 110 and 112, the deduplication vault storage 108, and the backups of the source storages 110 and 112 that are stored in the deduplication vault storage 108. For example, the database 114 and the metadata 116 may be identical or similar in structure and function to the database 500 and the metadata 700 disclosed in related U.S. patent application Ser. No. 13/782,549, titled "MULTIPHASE DEDUPLICATION," which was filed on Mar. 1, 2013 and is expressly incorporated herein by reference in its entirety. Subsequently, the deduplication module 118 and/or another module may restore each block that was stored in the source storage 110 or 112 at a particular point in time to a restore storage.

In one example embodiment, the deduplication vault system 102 may be a file server, the source system 104 may be a first desktop computer, the source system 106 may be a second desktop computer, and the network 120 may include the internet. In this example embodiment, the file server may be configured to periodically back up the storages of the first and second desktop computers over the internet as part of backup jobs by creating base backups and multiple incremental backups and storing them in the storage of the file server. The first and second desktop computers may also be configured to track modifications to their storages between backups in order to easily and quickly identify only those blocks that were modified for use in the creation of an incremental backup. The file server may also be configured to restore one or more of the backups to a storage of a restore computer over the internet if the first or second desktop computer experiences corruption of its storage or if the first or second desktop computer's storage becomes unavailable.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 120, it is understood that the systems 102 and 104 or 102 and 106 may instead communicate directly with each other. Further, the storage 110 or 112 may function as both a source storage and a restore storage. For example, in some embodiments the storage 110 or 112 may function as a source storage during the creation of a backup and as a restore storage during a restoration of the backup, which may enable the storage 110 or 112 to be restored to a state of an earlier point in time.

Further, although the deduplication module 118, the encryption module 124, and the encryption module 126 are the only modules disclosed in the example deduplication backup system 100 of FIG. 1, it is understood that the functionality of the modules 118, 124, and 126 may be replaced or augmented by one or more similar modules residing on any of the systems 102, 104, and 106 or another system. Finally, although only two source storages 110 and 112 are disclosed in the example deduplication backup system 100 of FIG. 1, it is understood that the deduplication vault system 102 of FIG. 1 may be configured to simultaneously back up many more source storages and/or to simultaneously restore many more restore storages. For example, the greater the number of source storages that are backed up to the deduplication vault storage 108, the greater the likelihood for reducing redundancy and for reducing the overall number of blocks being backed up, resulting in corresponding decreases in the bandwidth overhead of transporting blocks to the deduplication vault storage 108.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

FIGS. 2A-2D are schematic diagrams illustrating client-side encryption 200 in the deduplication backup system 100. Prior to the client-side encryption 200, the deduplication vault storage 108 may have been seeded with common blocks and/or various image backup operations of one or more backup jobs may have transpired, which will have resulted in the insertions of various blocks into the deduplication vault storage 108, such as the blocks at positions 108(4)-108(8).

Further, prior to the client-side encryption 200, allocated blocks in the source storages 110 and 112 are identified as being appropriate for being backed up. In the case of a base backup, all allocated blocks may be identified, and in the case of an incremental, only allocated blocks that have potentially been modified may be identified. The client-side encryption 200 illustrates the creation of the base backup A of the source storage 110 to represent the state of the source storage 110 at time t(0) in FIGS. 2A-2B, and illustrates the creation of the base backup B of the source storage 112 to represent the state of the source storage 112 at time t(1) in FIGS. 2C-2D. Although the source storages 110 and 112 are each depicted with only eight blocks and the deduplication vault storage 108 is depicted with only sixteen blocks, it is understood that the storages 108, 110, and 112 may include many more blocks, such as millions or billions or potentially even more blocks. Plain text blocks in the drawings are illustrated with a hatch pattern than angles down to the left, while encrypted blocks are illustrated in the drawings with a hatch pattern than angles down to the right. Hash values, also referred to herein as hashes, are illustrated as "HX," where X is a number that represents a unique hash.

As disclosed in FIG. 2A, a snapshot is taken of the source storage 110 at time t(0) and allocated plain text blocks at positions 110(1), 110(2), 110(4), 110(6), and 110(7) are targeted to be included in the base backup A of the source storage 110. Each of these blocks is then read from the source storage 110, hashed, using a 1st cryptographic hash function, to generate a 1st hash, and then the 1st hash is hashed, using a 2nd cryptographic hash function, to generate a 2nd hash. Next, it is determined whether the 2nd hash matches any key in the key-value table of the deduplication vault storage 108, where each key-value pair in the key-value table includes a key that is a hash and a value that is an encrypted block. As disclosed in FIG. 2A, only the 2nd hash H38 matches the key at position 108(4) in the key-value table, while the 2nd hashes H27, H23, and H29 do not match any key in the key value table. Next, an entry is inserted into an image map 202 corresponding to the base backup A of the source storage 110 that includes the corresponding 1st hash H18 and the position 110(2) of the plain text block as stored in the source storage 110. Where multiple items of data are included in the same entry in an image map, it is understood that the items are associated with one another and that this association is stored in the entry. Therefore, the inclusion of the 1st hash H18 and the position 110(2) into the same entry in the image map 202 in this example associates the 1st hash H18 with the position 110(2). The image maps disclosed in the drawings may be implemented in the metadata 116 of the duplication vault system 102 of FIG. 1. Further, the image maps disclosed in the drawings may be stored in plain text or may themselves be encrypted. Also, the image maps disclosed in the drawings may each be stored locally in the source storage of the corresponding source system or may each be stored remotely in the deduplication vault storage 108 of the deduplication vault system 102. When the image map is encrypted, it may be encrypted after the backup phases disclosed herein, and then decrypted prior to the restore phases disclosed herein.

As disclosed in FIG. 2B, since the 2nd hashes H27, H23, and H29 do not match any key in the key value table, each of their corresponding plain text blocks is encrypted, using an encrypt/decrypt function, using the 1st hash as an encryption password, and then a key-value pair is inserted into the key-value table with the key being the 2nd hash and the value being the encrypted block, and then an entry is inserted into the image map 202 corresponding to the source storage 110 that includes the 1st hash and a position of the plain text block as stored in the source storage 110. It is noted that since the block at position 110(4) and the block at position 110(7) are duplicates, only the first instance of this duplicate block is encrypted and inserted into the key-value table, but entries for both of the duplicate blocks are inserted into the image map 202. It is further noted that an "encrypt/decrypt function" may actually be two separate functions, one for encrypting and another for decrypting, in which case the "encrypt/decrypt function" is the combination of an encrypt function and a decrypt function. It is also noted that each block may be processed individually through each of the steps disclosed in FIGS. 2A and 2B, and below in FIGS. 2C and 2D, instead of a step being performed concurrently on all relevant blocks.

Figure 2C:
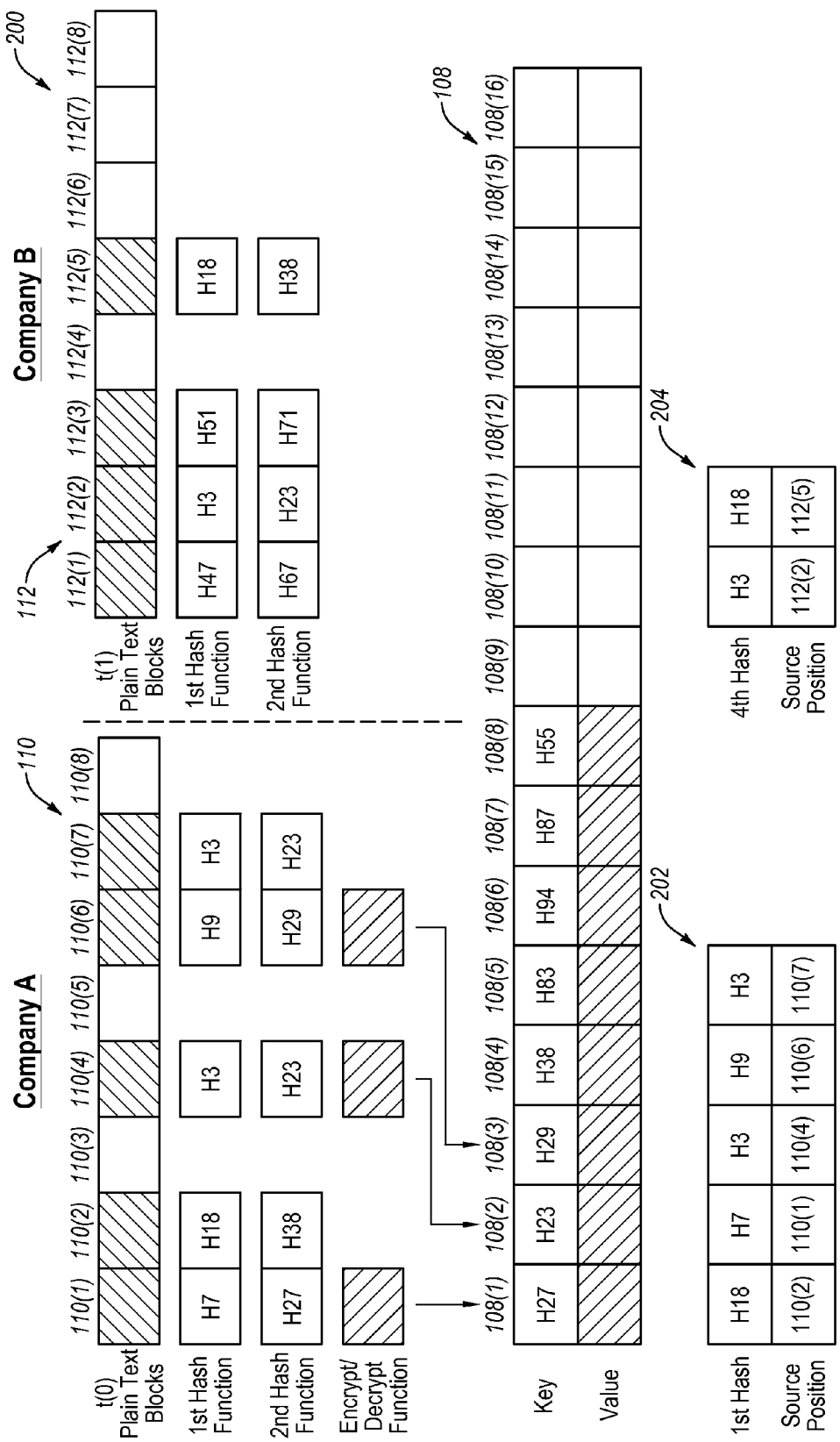

As disclosed in FIG. 2C, a snapshot is then taken of the source storage 112 at time t(1) and allocated plain text blocks at positions 112(1), 112(2), 112(3), and 112(5) are targeted to be included in the base backup B of the source storage 112. Each of these blocks is then read from the source storage 112, hashed, using the 1st cryptographic hash function, to generate a 1st hash, and then the 1st hash is hashed, using the 2nd cryptographic hash function, to generate a 2nd hash. Next, it is determined whether the 2nd hash matches any key in the key-value table of the deduplication vault storage 108. As disclosed in FIG. 2C, only the 2nd hashes H23 and H38 match the keys at positions 108(2) and 108(4), respectively, in the key-value table, while the 2nd hashes H67 and H71 do not match any key in the key value table. Next, entries are inserted into an image map 204 corresponding to the base backup B of the source storage 112 that each includes the corresponding 1st hash and the position of the plain text block as stored in the source storage 112.

Figure 2D:
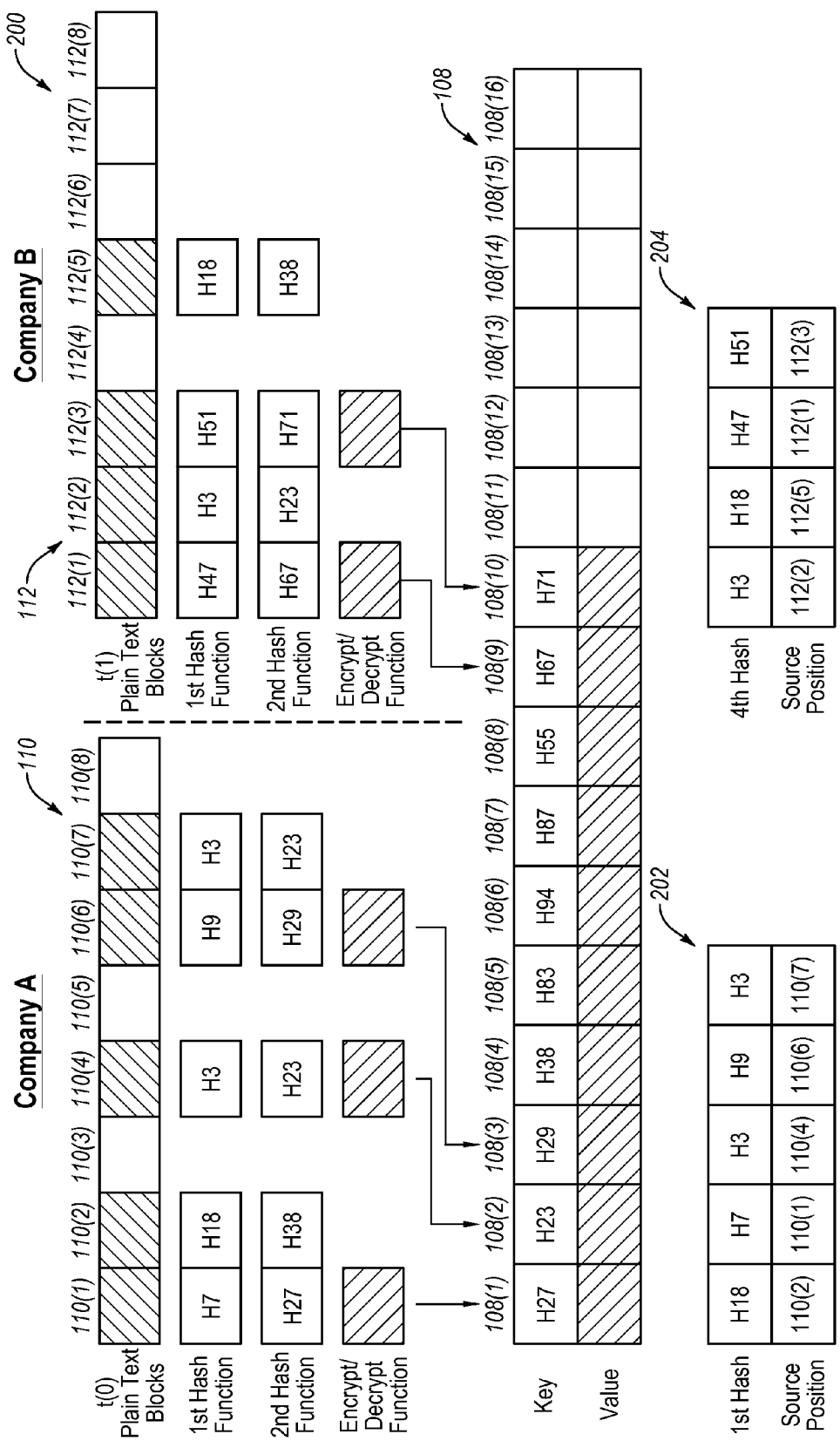

As disclosed in FIG. 2D, since the 2nd hashes H67 and H71 do not match any key in the key value table, each of their corresponding plain text blocks is encrypted, using the encrypt/decrypt function, using the 1st hash as an encryption password, then a key-value pair are inserted into the key-value table with the key being the 2nd hash and the value being the encrypted block, and an entry is inserted into the image map 204 corresponding to the source storage that includes the 1st hash and a position of the plain text block as stored in the source storage 110.

Therefore, during the client-side encryption 200 of FIGS. 2A-2D, plain-text blocks of the source storages 110 and 112 may be encrypted at the source system 104 of Company A and at the source system 106 of Company B prior to sending the blocks to the deduplication vault storage 108. This client-side encryption 200 reduces the potential for an unauthorized user to access the original plain-text blocks. Further, the client-side encryption 200 encrypts plain-text blocks in such a way that only a single encrypted block is stored in the deduplication vault storage 108 for each unique plain-text block that is backed up across the source storages 110 and 112. For example, only a single encrypted block is stored at position 108(4) of the key value table for the duplicate blocks at positions 110(2) and 112(5), and only a single encrypted block is stored at position 108(2) of the key value table for the duplicate blocks at positions 110(4), 110(7), and 112(2). Thus, the client-side encryption 200 employs client-side encryption with deduplication which enables sensitive blocks to remain secure within the key value table of the deduplication vault storage 108 even while redundancy within and across the source storages 110 and 112 is reduced or eliminated. As disclosed in FIGS. 2A-2D, since the blocks at positions 110(2), 110(7), 112(2), and 112(5) are already duplicated in the deduplication vault storage 108 at the time that the base backups A and B of the source storages 110 and 112 are created in the deduplication vault storage 108, these blocks do not need to be copied from the source storages 110 and 112 to the deduplication vault storage 108, resulting in decreased bandwidth overhead of transporting blocks to the deduplication vault storage 108 and increased efficiency and speed during the creation of the base backups A and B.

Figure 3A:
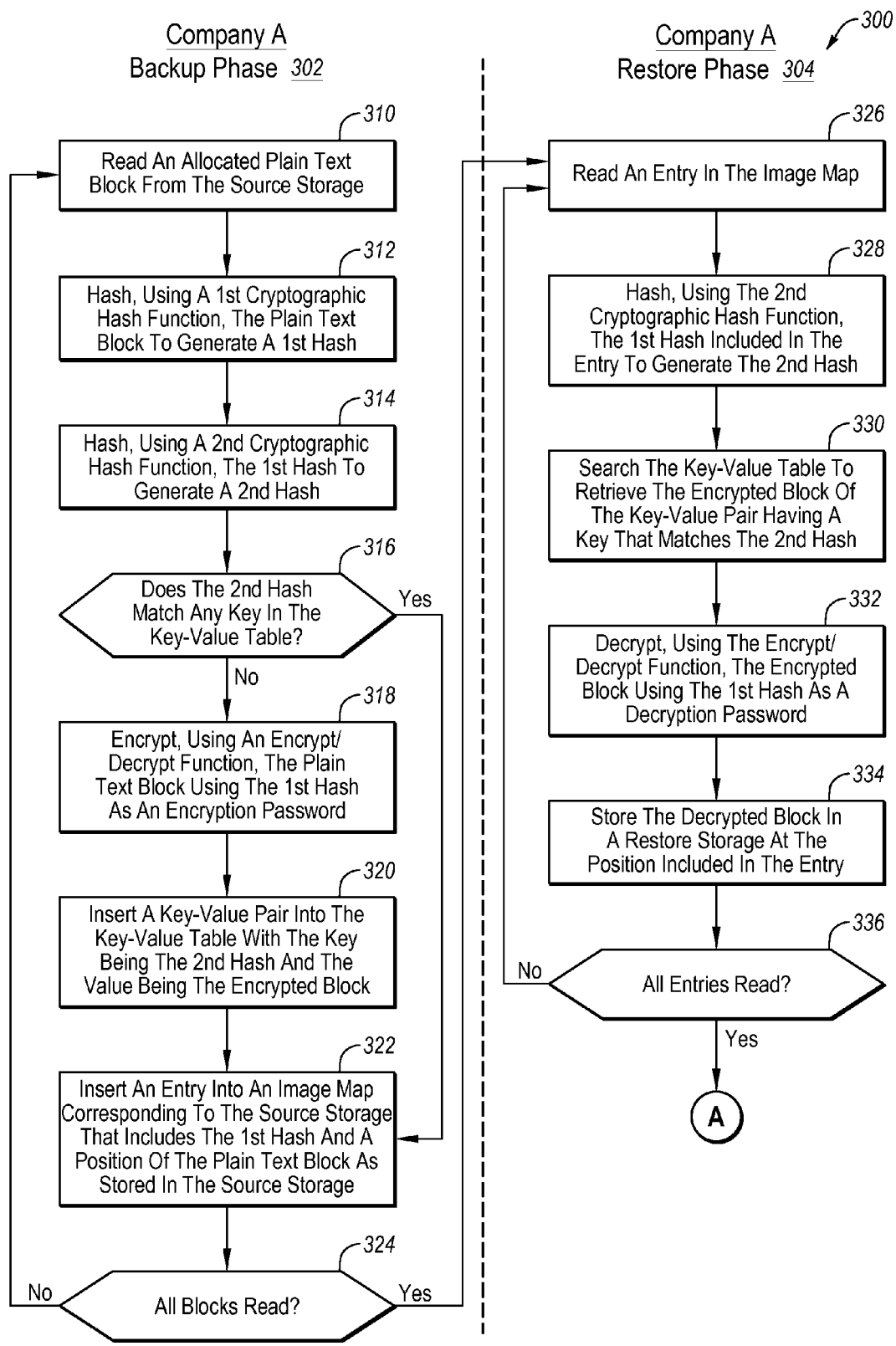
FIGS. 3A-3B is a schematic flowchart illustrating a first example method for client-side encryption in a deduplication backup system.
Figure 3B:
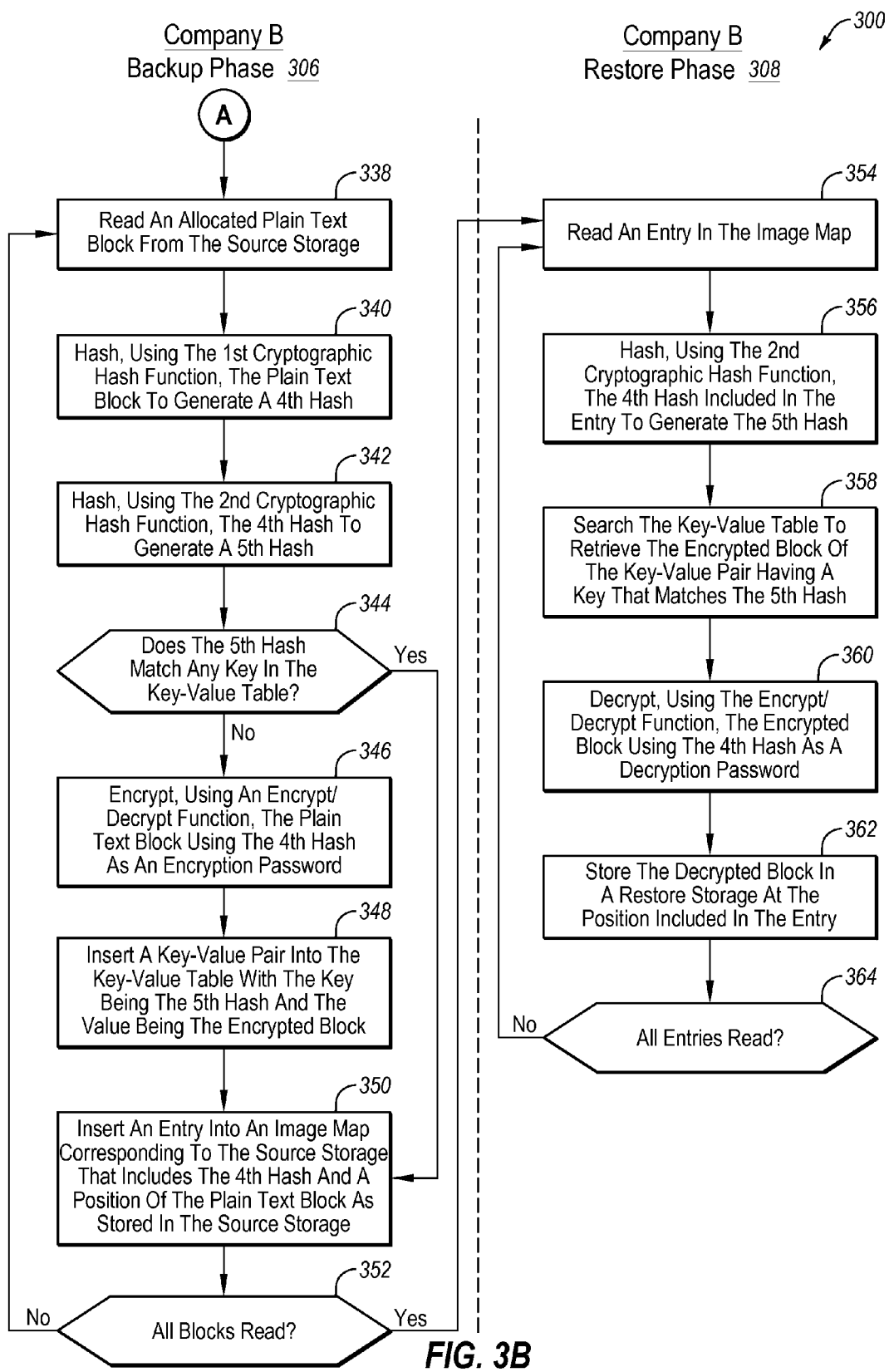

FIGS. 3A-3B is a schematic flowchart illustrating a first example method 300 for client-side encryption in the deduplication backup system 100. The method 300 may be implemented, in at least some embodiments, by the deduplication module 118 of the deduplication vault system 102, by the encryption module 124 of the source system 104, and by the encryption module 126 of the source system 106 of FIG. 1. For example, these modules may be configured to execute computer instructions to perform operations of client-side encryption of the source storages 110 and 112 prior to being backed up into the deduplication vault storage 108, as represented by one or more of phases 302-308 which are made up of the steps 310-364 of the method 300. Although illustrated as discrete phases and steps, various phases/steps may be divided into additional phases/steps, combined into fewer phases/steps, reordered, or eliminated, depending on the desired implementation. The method 300 will now be discussed with reference to FIGS. 1, 2A-2D, and 3A-3B.

The method 300 may include a backup phase 302 for Company A, a restore phase 304 for Company A, a backup phase 306 for Company B, and a restore phase 308 for Company B.

The backup phase 302 of the method 300 may include a step 310 in which an allocated plain text block is read from the source storage. For example, the encryption module 124 may read, at step 310, the plain text block at position 110(1) or 110(2) from the source storage 110, as disclosed in FIG. 2A.

The backup phase 302 of the method 300 may include a step 312 in which the plain text blocks is hashed, using a 1st cryptographic hash function, to generate a 1st hash. Continuing with the above example, the encryption module 124 may hash, at step 312, the plain text block from position 110(1) or 110(2) using the 1st cryptographic hash function to generate a 1st hash, such as the 1st hash H7 or the 1st hash H18, as disclosed in FIG. 2A. The $1^{st}$ cryptographic hash function may be a SHA-1, SHA-2, SHA-3, MD5, or other cryptographic hash function, for example.

The backup phase 302 of the method 300 may include a step 314 in which the 1st hash is hashed, using a 2nd cryptographic hash function, to generate a 2nd hash. Continuing with the above example, the encryption module 124 may hash, at step 314, the 1st hash H7 or the 1st hash H18 using the 2nd cryptographic hash function to generate the 2nd hash H27 or the 2nd hash H38, as disclosed in FIG. 2A. The 2nd cryptographic hash function may be a SHA-1, SHA-2, SHA-3, MD5, or other cryptographic hash function, for example, and may be the same as, or different from, the 1st cryptographic hash function.

The backup phase 302 of the method 300 may include a step 316 in which a key-value table of a deduplication vault is searched to determine whether the 2nd hash matches any key in the key-value table, where each key-value pair in the key-value table includes a key that is a hash and a value that is an encrypted block. Continuing with the above example, the deduplication module 118 may search, at step 316, the key-value table of the deduplication vault storage 108 to determine that the 2nd hash H27 does not match any key in the key-value table, or to determine that the 2nd hash H38 does match a key at position 108(4) in the key-value table, as disclosed in FIG. 2B. Upon determining that the second hash does not match any key in the key-value table (No at step 316), the backup phase 302 of the method 300 may include steps 318 and 320. Otherwise (Yes at step 316), the backup phase 302 of the method 300 may proceed directly to the step 322.

The backup phase 302 of the method 300 may include a step 318 in which the plain text block is encrypted, using an encrypt/decrypt function, using the 1st hash as an encryption password. Continuing with the above example, the encryption module 124 may encrypt, at step 318, the plain text block from position 110(1) using an encrypt/decrypt function, using the 1st hash H7 as an encryption password, resulting in an encrypted version of the plain text block from position 110(1), as disclosed in FIG. 2B.

The backup phase 302 of the method 300 may include a step 320 in which a key-value pair is inserted into the key-value table with the key being the 2nd hash and the value being the encrypted block. Continuing with the above example, the deduplication module 118 may insert, at step 320, a key-value pair into the key-value table at position 108(1) with the key being the 2nd hash H27 and the value being the encrypted version of the plain text block at position 110(1), as disclosed in FIG. 2B.

The backup phase 302 of the method 300 may include a step 322 in which an entry is inserted into an image map corresponding to the source storage that includes the 1st hash and a position of the plain text block as stored in the source storage. Continuing with the above example, the deduplication module 118 may insert, at step 322, an entry into the image map 202 corresponding to the source storage 110 that includes the 1st hash H18 and position 110(2), as disclosed in FIG. 2A, or that includes the 1st hash H7 and position 110(1), as disclosed in FIG. 2B.

The backup phase 302 of the method 300 may include a step 324 in which it is determined whether all appropriate blocks to be included in the backup have been read from the source storage. In the case of a base backup, all unique allocated blocks may be identified, and in the case of an incremental, only unique allocated blocks that have potentially been modified may be identified. Continuing with the above example, the deduplication module 118 may determine, at step 324, whether all of the allocated blocks at positions 110(1), 110(2), 110(4), 110(6), and 110(7) have been read from the source storage 110, as disclosed in FIG. 2B. If it is determined at step 324 that all allocated blocks have not been read from the source storage 110 (No at step 324), then the method 300 returns to step 310 where the next allocated block is read from the source storage 110. Otherwise (Yes at step 324), the backup phase 302 of the method 300 is complete, and the method 300 proceeds to step 326 of the restore phase 304.

By the conclusion of the backup phase 302, a backup of the source storage 110 will have been stored in the deduplication vault storage 108. Unlike a standard backup image, however, the backup of the source storage 110 as stored in the deduplication vault storage 108 has been reduced in size due to not storing multiple copies of the blocks from positions 110(2) and 110(7), as disclosed in FIG. 2B. In addition, where multiple storages are backed up into the deduplication vault storage 108, the total overall size of the backups will likely be reduced in size due to the elimination of duplicate blocks across the backups. Finally, unlike standard deduplication vault storages, the deduplication vault storage 108 is configured to store each of the plain text blocks of the source storage 110 included in the backup as encrypted blocks, thus reducing the potential for an unauthorized user, such as a user from Company B, to access the original plain-text blocks, except for those blocks that are included in a backup of the unauthorized user.

The restore phase 304 of the method 300 may include a step 326 in which an entry is read in the image map. For example, the deduplication module 118 may read, at step 326, the first entry in the image map 202, which includes the 1st hash H18 and source position 110(2), as disclosed in FIG. 2B.

The restore phase 304 of the method 300 may include a step 328 in which the 1st hash included in the entry is hashed, using the 2nd cryptographic hash function, to generate the 2nd hash. Continuing with the above example, the encryption module 124 may hash, at step 328, the 1st hash H18, using the 2nd cryptographic hash function, to generate the 2nd hash H38, as disclosed in FIG. 2B.

The restore phase 304 of the method 300 may include a step 330 in which the key-value table is searched to retrieve the encrypted block of the key-value pair having a key that matches the 2nd hash. Continuing with the above example, the deduplication module 118 may search, at step 330, the key-value table of the deduplication vault storage 108 to retrieve the encrypted block of the key-value pair at position 108(4) that has a key that matches the 2nd hash H38, as disclosed in FIG. 2B.

The restore phase 304 of the method 300 may include a step 332 in which the encrypted block is decrypted, using the encrypt/decrypt function, and using the 1st hash as a decryption password. Continuing with the above example, the encryption module 124 may decrypt, at step 332, the encrypted block, using the encrypt/decrypt function, and using the 1st hash H18 as a decryption password, resulting in the plain text block from position 110(2) of the source storage 110, as disclosed in FIG. 2B.

The restore phase 304 of the method 300 may include a step 334 in which the decrypted block is stored in a restore storage at the position included in the entry. Continuing with the above example, the encryption module 124 may store, at step 334, the decrypted block in the source storage 110, where the source storage 110 is functioning as a restore storage, in the position 110(2), as disclosed in FIG. 2B.

The restore phase 304 of the method 300 may include a step 336 in which it is determined whether all entries have been read from the image map. Continuing with the above example, the deduplication module 118 may determine, at step 336, whether all of the entries have been read from the image map 202, as disclosed in FIG. 2B. If it is determined at step 336 that all entries have not been read from the image map 202 (No at step 336), then the method 300 returns to step 326 where the next entry is read from the image map 202. Otherwise (Yes at step 336), the restore phase 304 of the method 300 is complete, and the method 300 proceeds to step 338 of the backup phase 306.

By the conclusion of the restore phase 304, a backup of the source storage 110 that was stored in the deduplication vault storage 108 will have been restored to a restore storage. Unlike a standard restoration, however, the restoration of the backup of the source storage 110 involves the backup remaining securely encrypted until being decrypted at the source system 104, thus reducing the potential for an unauthorized user, such as a user from Company B, to access the original plain-text blocks, except for those blocks that are included in a backup of the unauthorized user.

The backup phase 306 and the restore phase 308 of the method 300 are similar in many respects to the backup phase 302 and the restore phase 304 of the method 300, the main difference being that the backup phase 306 and the restore phase 308 are performed on the source system 106 of Company B instead of on the source system 104 of Company A.

The backup phase 306 of the method 300 may include a step 338 in which an allocated plain text block is read from the source storage. For example, the encryption module 126 may read, at step 338, the plain text block at position 112(1) or 112(2) from the source storage 112, as disclosed in FIG. 2C.

The backup phase 306 of the method 300 may include a step 340 in which the plain text block is hashed, using the same 1st cryptographic hash function used in the step 312, to generate a 4th hash. Continuing with the above example, the encryption module 126 may hash, at step 340, the plain text block from position 112(1) or 112(2) using the 1st cryptographic hash function to generate a 4th hash, such as the 4th hash H47 or the 4th hash H3, as disclosed in FIG. 2C.

The backup phase 306 of the method 300 may include a step 342 in which the 4th hash is hashed, using the same 2nd cryptographic hash function used in step 314, to generate a 5th hash. Continuing with the above example, the encryption module 126 may hash, at step 342, the 4th hash H47 or the 4th hash H3 using the 2nd cryptographic hash function to generate the 5th hash H67 or the 5th hash H23, as disclosed in FIG. 2C.

The backup phase 306 of the method 300 may include a step 344 in which a key-value table of a deduplication vault is searched to determine whether the 5th hash matches any key in the key-value table. Continuing with the above example, the deduplication module 118 may search, at step 344, the key-value table of the deduplication vault storage 108 to determine that the 5th hash H67 does not match any key in the key-value table, or to determine that the 5th hash H23 does match a key at position 108(2) in the key-value table, as disclosed in FIG. 2C. Upon determining that the second hash does not match any key in the key-value table (No at step 344), the backup phase 306 of the method 300 may include steps 346 and 348. Otherwise (Yes at step 344), the backup phase 306 of the method 300 may proceed directly to the step 350.

The backup phase 306 of the method 300 may include a step 346 in which the plain text block is encrypted, using an encrypt/decrypt function, using the 4th hash as an encryption password. Continuing with the above example, the encryption module 126 may encrypt, at step 346, the plain text block from position 112(1) using an encrypt/decrypt function, using the 4th hash H47 as an encryption password, resulting in an encrypted version of the plain text block from position 112(1), as disclosed in FIG. 2D.

The backup phase 306 of the method 300 may include a step 348 in which a key-value pair is inserted into the key-value table with the key being the 5th hash and the value being the encrypted block. Continuing with the above example, the deduplication module 118 may insert, at step 348, a key-value pair into the key-value table at position 108(9) with the key being the 5th hash H67 and the value being the encrypted version of the plain text block from position 112(1), as disclosed in FIG. 2D.

The backup phase 306 of the method 300 may include a step 350 in which an entry is inserted into an image map corresponding to the source storage that includes the 4th hash and a position of the plain text block as stored in the source storage. Continuing with the above example, the deduplication module 118 may insert, at step 350, an entry into the image map 204 corresponding to the source storage 112 that includes the 4th hash H3 and position 112(2), as disclosed in FIG. 2C, or that includes the 4th hash H47 and position 112(1), as disclosed in FIG. 2D.

The backup phase 306 of the method 300 may include a step 352 in which it is determined whether all appropriate blocks to be included in the backup have been read from the source storage. Continuing with the above example, the deduplication module 118 may determine, at step 352, whether all of the allocated blocks at positions 112(1), 112(2), 112(3), and 112(5) have been read from the source storage 112, as disclosed in FIG. 2D. If it is determined at step 352 that all allocated blocks have not been read from the source storage 112 (No at step 352), then the method 300 returns to step 338 where the next allocated block is read from the source storage 112. Otherwise (Yes at step 352), the backup phase 306 of the method 300 is complete, and the method 300 proceeds to step 354 of the restore phase 308.

By the conclusion of the backup phase 306, a backup of the source storage 112 will have been stored in the deduplication vault storage 108, along with the backup of the source storage 110. Unlike a standard backup image, however, the backup of the source storage 112 as stored in the deduplication vault storage 108 has been reduced in size due to not storing multiple copies of the duplicate blocks from positions 112(2) and 112(5), as disclosed in FIG. 2D. Further, the method 300 is employed to encrypt the duplicate plain-text block from position 110(4) and position 112(2) in such a way that only a single encrypted block is stored in position 108(2) in the deduplication vault storage 108 for this duplicate block. Similarly, the method 300 is employed to encrypt the duplicate plain-text block from position 110(2) and position 112(5) in such a way that only a single encrypted block is stored in position 108(4) in the deduplication vault storage 108 for this duplicate block. Therefore, unlike standard deduplication vaults, which either store a single plain-text deduplicated block or store a single plain-text block in two different encrypted forms, the method 300 disclosed herein employs client-side encryption with deduplication which enables sensitive blocks to remain secure within the deduplication vault storage 108 even while redundancy within and across the source storages 110 and 112 is reduced or eliminated.

The restore phase 308 of the method 300 may include a step 354 in which an entry is read in the image map. For example, the deduplication module 118 may read, at step 354, the first entry in the image map 204 which includes the 4th hash H3 and source position 112(2), as disclosed in FIG. 2D.

The restore phase 308 of the method 300 may include a step 356 in which the 4th hash included in the entry is hashed, using the 2nd cryptographic hash function, to generate the 5th hash. Continuing with the above example, the encryption module 126 may hash, at step 356, the 4th hash H3, using the 2nd cryptographic hash function, to generate the 5th hash H23, as disclosed in FIG. 2D.

The restore phase 308 of the method 300 may include a step 358 in which the key-value table is searched to retrieve the encrypted block of the key-value pair having a key that matches the 5th hash. Continuing with the above example, the deduplication module 118 may search, at step 358, the key-value table of the deduplication vault storage 108 to retrieve the encrypted block of the key-value pair at position 108(2) that has a key that matches the 5th hash H23, as disclosed in FIG. 2D.

The restore phase 308 of the method 300 may include a step 360 in which the encrypted block is decrypted, using the encrypt/decrypt function, and using the 4th hash as a decryption password. Continuing with the above example, the encryption module 126 may decrypt, at step 360, the encrypted block, using the encrypt/decrypt function, and using the 4th hash H3 as a decryption password, resulting in the plain text block from position 112(2) of the source storage 112, as disclosed in FIG. 2D.

The restore phase 308 of the method 300 may include a step 362 in which the decrypted block is stored in a restore storage at the position included in the entry. Continuing with the above example, the encryption module 126 may store, at step 362, the decrypted block in the source storage 112, where the source storage 112 is functioning as a restore storage, in the position 112(2), as disclosed in FIG. 2D.

The restore phase 308 of the method 300 may include a step 364 in which it is determined whether all entries have been read from the image map. Continuing with the above example, the deduplication module 118 may determine, at step 364, whether all of the entries have been read from the image map 204, as disclosed in FIG. 2D. If it is determined at step 364 that all entries have not been read from the image map 204 (No at step 364), then the method 300 returns to step 354 where the next entry is read from the image map 204. Otherwise (Yes at step 364), the restore phase 308 of the method 300 is complete.

By the conclusion of the restore phase 308, a backup of the source storage 112 that was stored in the deduplication vault storage 108 will have been restored to a restore storage. Unlike a standard restoration, however, the restoration of the backup of the source storage 112 involves the backup remaining securely encrypted until being decrypted at the source system 106, thus reducing the potential for an unauthorized user, such as a user from Company A, to access the original plain-text blocks, except for those blocks that are included in a backup of the unauthorized user.

FIGS. 4A-4D are schematic diagrams illustrating client-side encryption 400 in the deduplication backup system 100. The client-side encryption 400 may be implemented, in at least some embodiments, with similar events occurring prior to the client-side encryption 400 as occurred prior to the client-side encryption 200 discussed above.

As disclosed in FIG. 4A, a snapshot is taken of the source storage 110 at time t(0) and allocated plain text blocks at positions 110(1), 110(2), 110(4), 110(6), and 110(7) are targeted to be included in the base backup A of the source storage 110. Each of these blocks is then read from the source storage 110, hashed, using the 1st cryptographic hash function, to generate a 1st hash, and then encrypted, using the encrypt/decrypt function, using the 1st hash as an encryption password. The encrypted block is then hashed, using the 2nd cryptographic hash function, to generate a 3rd hash. Next, it is determined whether the 3rd hash matches any key in the key-value table of the deduplication vault storage 108. As disclosed in FIG. 4A, only the 3rd hash H118 matches the key at position 108(4) in the key-value table, while the 3rd hashes H107, H103, and H109 do not match any key in the key value table. Next, an entry is inserted into an image map 402 corresponding to the base backup A of the source storage 110 that includes the corresponding 1st hash H18, the corresponding 3rd hash H118, and the position 110(2) of the plain text block as stored in the source storage 110.

Figure 4B:
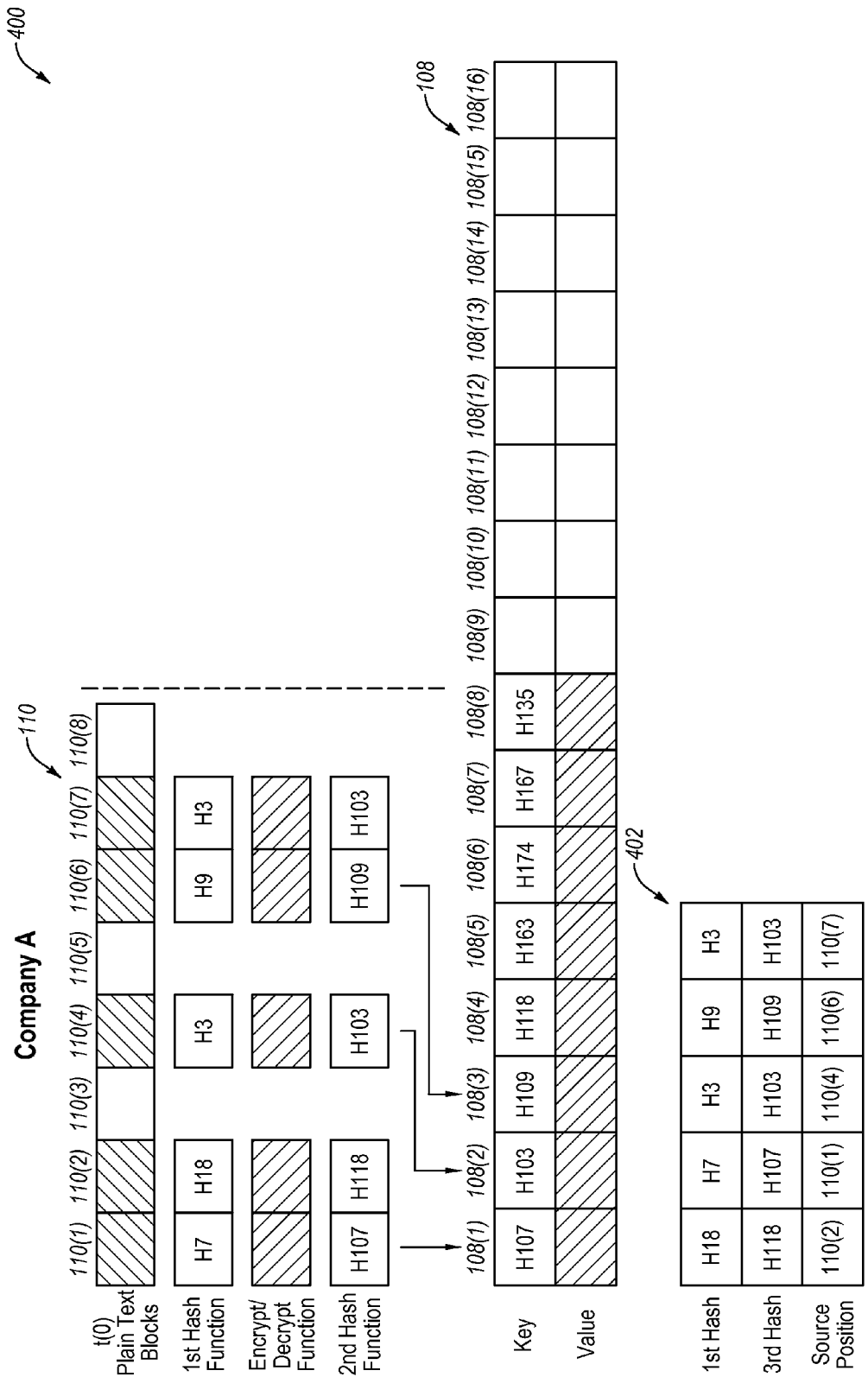

As disclosed in FIG. 4B, since the 3rd hashes H107, H103, and H109 do not match any key in the key value table, key-value pairs are inserted into the key value table for each with the key being the 3rd hash and the value being the corresponding encrypted block. Then, entries are inserted into the image map 402 corresponding to the source storage 110 that each includes the 1st hash, the 3rd hash, and the position of the plain text block as stored in the source storage 110. It is noted that since the block at position 110(4) and the block at position 110(7) are duplicates, only the first instance of this duplicate block is encrypted and inserted into the key-value table, but entries for both of the duplicate blocks are inserted into the image map 402.

Figure 4C:
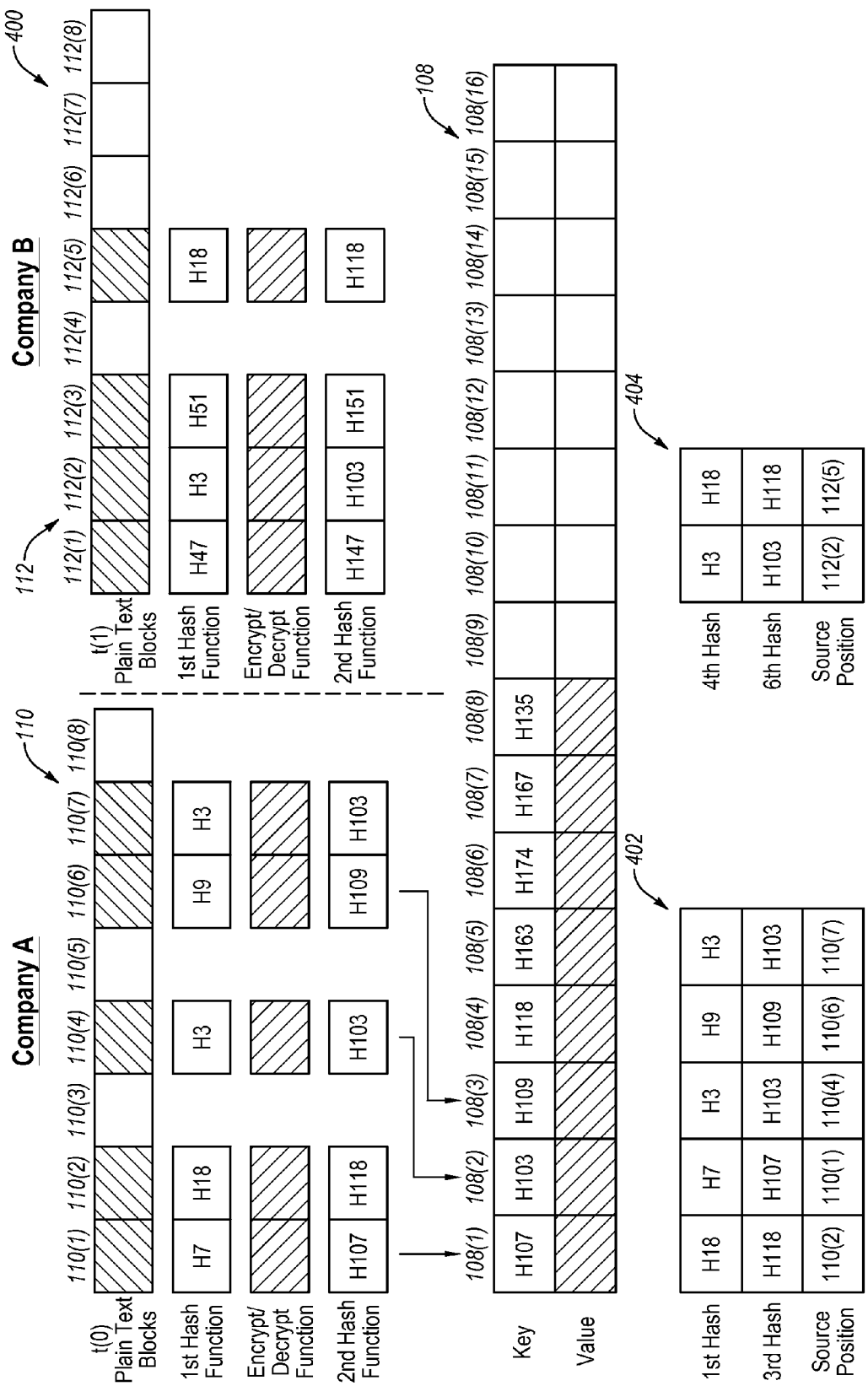

As disclosed in FIG. 4C, a snapshot is then taken of the source storage 112 at time t(1) and allocated plain text blocks at positions 112(1), 112(2), 112(3), and 112(5) are targeted to be included in the base backup B of the source storage 112.

Each of these blocks is then read from the source storage 112, hashed, using the 1st cryptographic hash function, to generate a 1st hash, and then encrypted, using the encrypt/decrypt function, using the 1st hash as an encryption password. The encrypted block is then hashed, using the 2nd cryptographic hash function, to generate a 3rd hash. Next, it is determined whether the 3rd hash matches any key in the key-value table of the deduplication vault storage 108. As disclosed in FIG. 4C, only the 3rd hashes H103 and H118 match the keys at positions 108(2) and 108(4), respectively, in the key-value table, while the 3rd hashes H147 and H151 do not match any key in the key value table. Next, entries are inserted into an image map 404 corresponding to the base backup B of the source storage 112 that each includes the corresponding 1st hash, the corresponding 3rd hash, and the position of the plain text block as stored in the source storage 112.

Figure 4D:
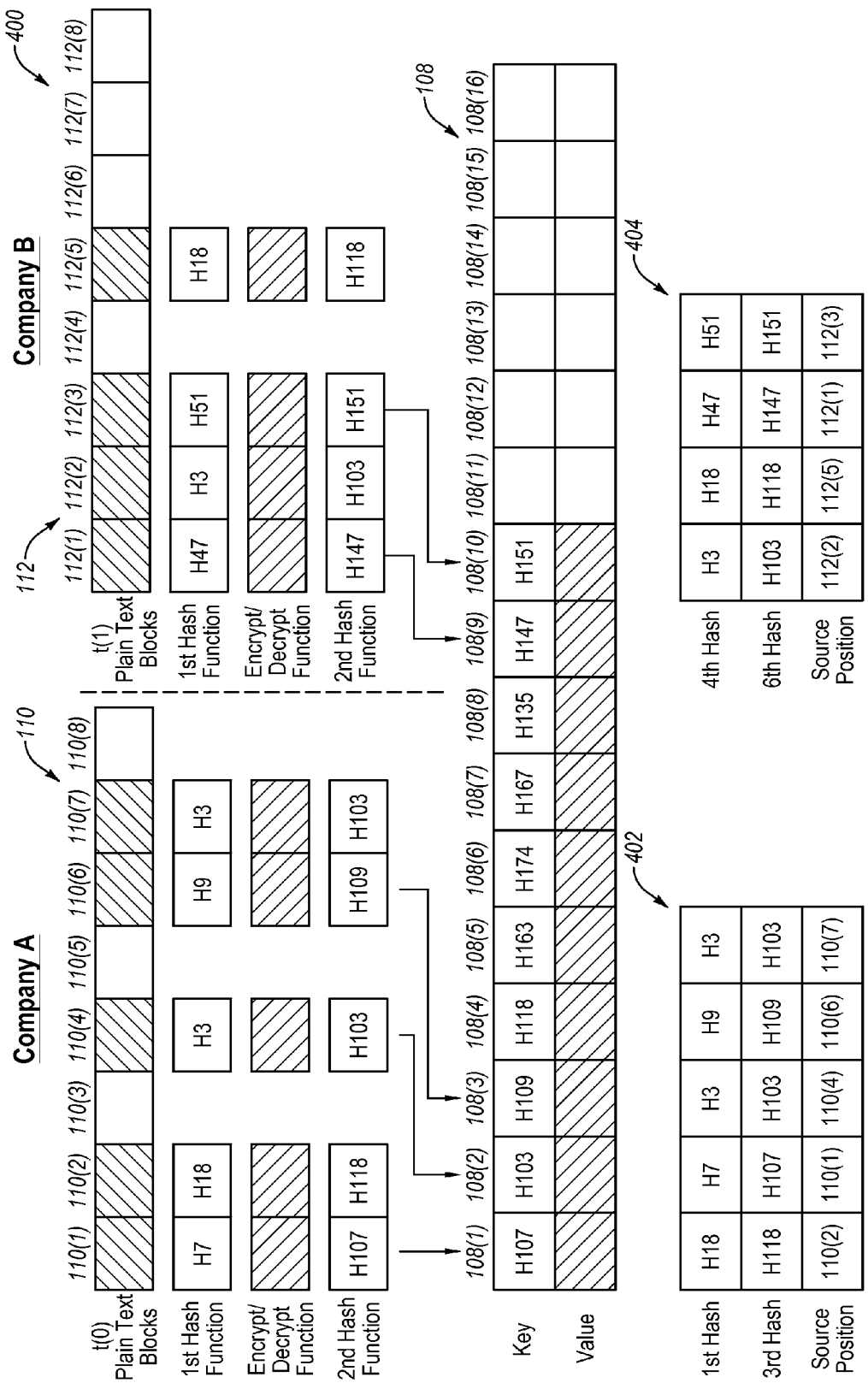

As disclosed in FIG. 4D, since the 3rd hashes H147 and H151 do not match any key in the key value table, key-value pairs are inserted into the key value table for each with the key being the 3rd hash and the value being the corresponding encrypted block. Then, entries are inserted into the image map 404 corresponding to the source storage 112 that each includes the 1st hash, the 3rd hash, and the position of the plain text block as stored in the source storage 112.

Therefore, during the client-side encryption 400 of FIGS. 4A-4D, plain-text blocks of the source storages 110 and 112 may be encrypted at the source system 104 of Company A and at the source system 106 of Company B prior to sending the blocks to the deduplication vault storage 108, which may result in benefits similar to those discussed above in connection with the client-side encryption 200 of FIGS. 2A-2D. In addition, the client-side encryption 400 may additionally include the added benefit of preventing the key-value table of the deduplication vault storage 108 from being "poisoned" by the malicious or inadvertent insertion of an encrypted block as a value that does not match the hash inserted as its corresponding key. Any "poisoning" of the key-value table may be prevented in the client-side encryption 400 because each 3rd hash inserted into the key-value table can be verified to match its corresponding encrypted block by rehashing the encrypted block using the 2nd cryptographic hash function, and comparing the results of the rehash operation with the 3rd hash, where if the comparison is not identical then the insert is deemed to be a poisoning attempt and is therefore rejected.

Figure 5A:
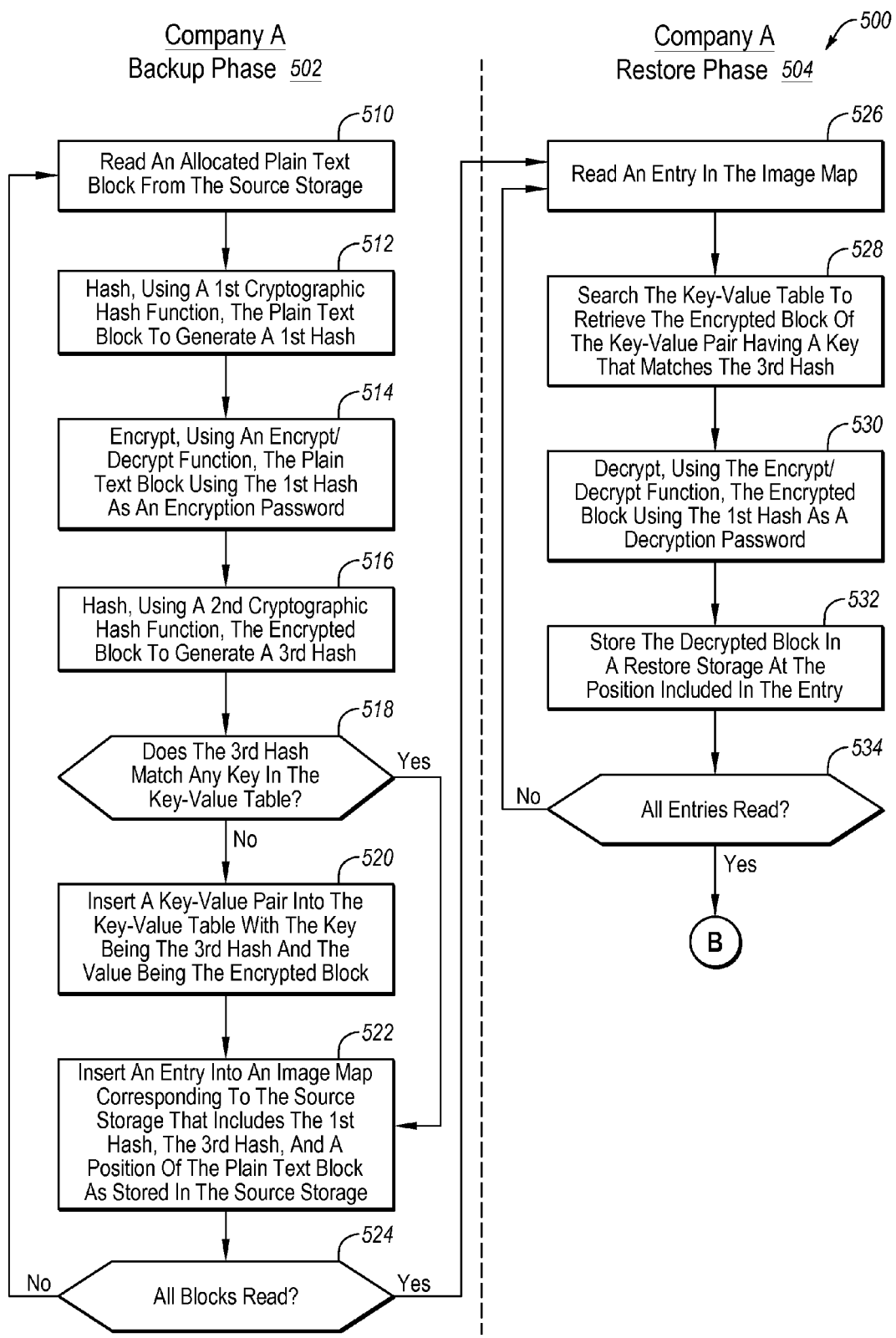
FIGS. 5A-5B is a schematic flowchart illustrating a second example method for client-side encryption in a deduplication backup system.
Figure 5B:
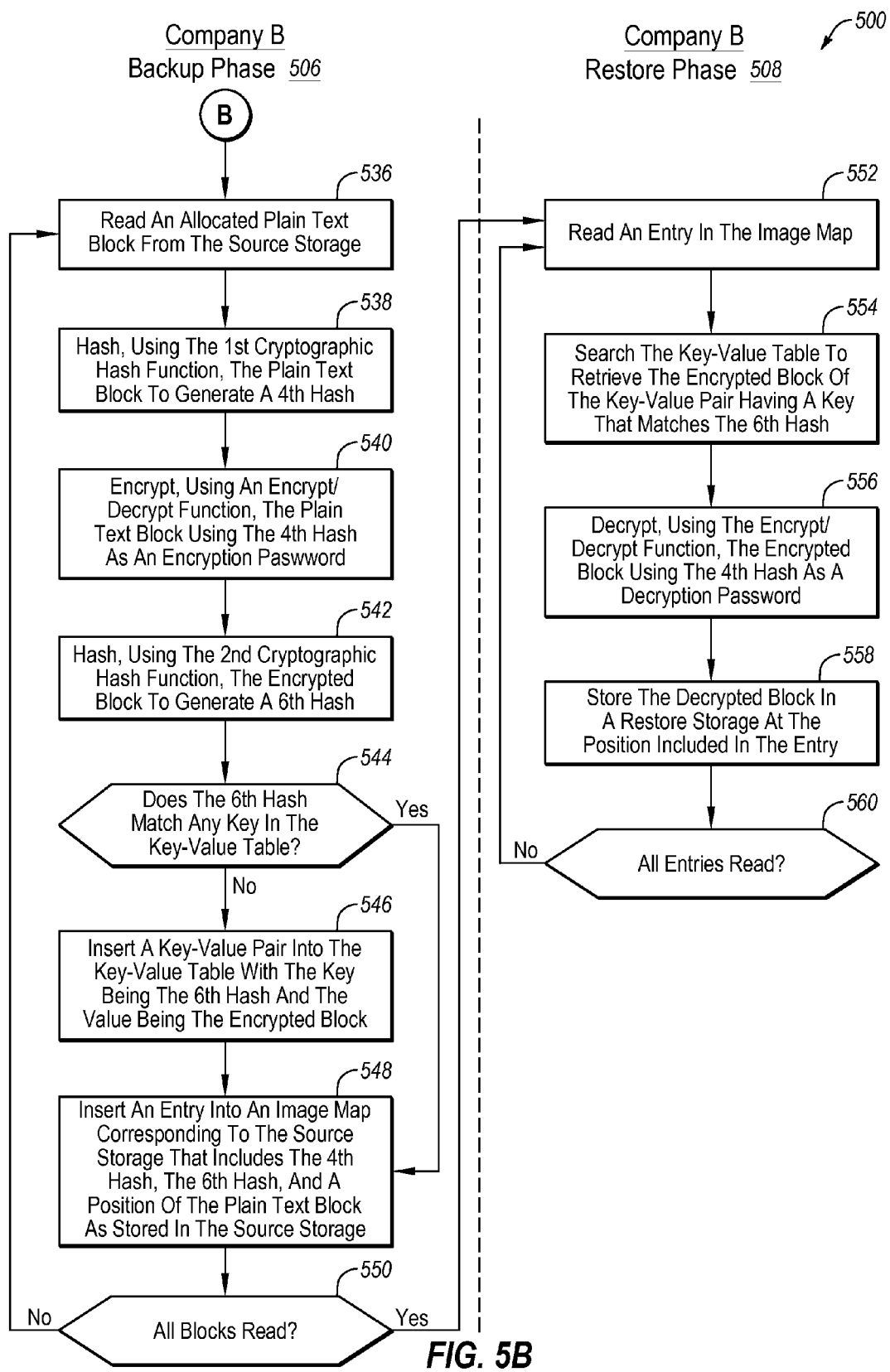

FIGS. 5A-5B is a schematic flowchart illustrating a second example method 500 for client-side encryption in the deduplication backup system 100. The method 500 may be implemented, in at least some embodiments, in a similar manner as the method 300 discussed above. The method 500 will now be discussed with reference to FIGS. 1, 4A-4D, and 5A-5B.

The method 500 may include a backup phase 502 for Company A, a restore phase 504 for Company A, a backup phase 506 for Company B, and a restore phase 508 for Company B.

The backup phase 502 of the method 500 may include a step 510 in which an allocated plain text block is read from the source storage. For example, the encryption module 124 may read, at step 510, the plain text block at position 110(1) or 110(2) from the source storage 110, as disclosed in FIG. 4A.

The backup phase 502 of the method 500 may include a step 512 in which the plain text blocks is hashed, using a 1st cryptographic hash function, to generate a 1st hash. Continuing with the above example, the encryption module 124 may hash, at step 512, the plain text block from position 110(1) or 110(2) using the 1st cryptographic hash function to generate the 1st hash H7 or the 1st hash H18, as disclosed in FIG. 4A.

The backup phase 502 of the method 500 may include a step 514 in which the plain text block is encrypted, using the encrypt/decrypt function, using the 1st hash as an encryption password. Continuing with the above example, the encryption module 124 may encrypt, at step 514, the plain text block from position 110(1) using the encrypt/decrypt function, using the 1st hash H7 as an encryption password, resulting in an encrypted version of the plain text block from position 110(1), as disclosed in FIG. 4A. Similarly, the encryption module 124 may encrypt, at step 514, the plain text block from position 110(2) using the encrypt/decrypt function, using the 1st hash H18 as an encryption password, resulting in an encrypted version of the plain text block from position 110(2), as disclosed in FIG. 4A.

The backup phase 502 of the method 500 may include a step 516 in which the encrypted block is hashed, using the 2nd cryptographic hash function, to generate a 3rd hash. Continuing with the above example, the encryption module 124 may hash, at step 516, the encrypted block corresponding to the plain text block at position 110(1) or position 110(2) using the 2nd cryptographic hash function to generate the 3rd hash H107 or the 3rd hash H118, as disclosed in FIG. 4A.

The backup phase 502 of the method 500 may include a step 518 in which a key-value table of a deduplication vault is searched to determine whether the 3rd hash matches any key in the key-value table. Continuing with the above example, the deduplication module 118 may search, at step 518, the key-value table of the deduplication vault storage 108 to determine that the 3rd hash H107 does not match any key in the key-value table, or to determine that the 3rd hash H118 does match a key at position 108(4) in the key-value table, as disclosed in FIG. 4A. Upon determining that the 3rd hash does not match any key in the key-value table (No at step 518), the backup phase 502 of the method 500 may include step 520. Otherwise (Yes at step 518), the backup phase 502 of the method 500 may proceed directly to step 522.

The backup phase 502 of the method 500 may include a step 520 in which a key-value pair is inserted into the key-value table with the key being the 3rd hash and the value being the encrypted block. Continuing with the above example, the deduplication module 118 may insert, at step 520, a key-value pair into the key-value table at position 108(1) with the key being the 3rd hash H107 and the value being the encrypted version of the plain text block at position 110(1), as disclosed in FIG. 4B.

The backup phase 502 of the method 500 may include a step 522 in which an entry is inserted into an image map corresponding to the source storage that includes the 1st hash, the 3rd hash, and a position of the plain text block as stored in the source storage. Continuing with the above example, the deduplication module 118 may insert, at step 522, an entry into the image map 402 corresponding to the source storage 110 that includes the 1st hash H18, the third hash H118, and position 110(2) of the plain text block as stored in the source storage 110, as disclosed in FIG. 4A, or that includes the 1st hash H7, the 3rd hash H107, and position 110(1) of the plain text block as stored in the source storage 110, as disclosed in FIG. 4B.

The backup phase 502 of the method 500 may include a step 524 in which it is determined whether all appropriate blocks to be included in the backup have been read from the source storage. Continuing with the above example, the deduplication module 118 may determine, at step 524, whether all of the allocated blocks at positions 110(1), 110(2), 110(4), 110(6), and 110(7) have been read from the source storage 110, as disclosed in FIG. 2B. If it is determined at step 524 that all allocated blocks have not been read from the source storage 110 (No at step 524), then the method 500 returns to step 510 where the next allocated block is read from the source storage 110. Otherwise (Yes at step 524), the backup phase 502 of the method 500 is complete, and the method 500 proceeds to step 526 of the restore phase 504.

By the conclusion of the backup phase 502, a backup of the source storage 110 will have been stored in the deduplication vault storage 108. Unlike a standard backup image, however, the backup of the source storage 110 as stored in the deduplication vault storage 108 has been reduced in size due to not storing multiple copies of the duplicate blocks from positions 110(2) and 110(7), as disclosed in FIG. 4B. In addition, where multiple storages are backed up into the deduplication vault storage 108, the total overall size of the backups will likely be reduced in size due to the elimination of duplicate blocks across the backups. Finally, unlike standard deduplication vault storages, the deduplication vault storage 108 is configured to store each of the plain text blocks of the source storage 110 included in the backup as encrypted blocks, thus reducing the potential for an unauthorized user, such as a user from Company B, to access the original plain-text blocks, except for those blocks that are included in a backup of the unauthorized user.

The restore phase 504 of the method 500 may include a step 526 in which an entry is read in the image map. For example, the deduplication module 118 may read, at step 526, the first entry in the image map 402 which includes the 1st hash H18, the 3rd hash H118, and source position 110(2), as disclosed in FIG. 4B.

The restore phase 504 of the method 500 may include a step 528 in which the key-value table is searched to retrieve the encrypted block of the key-value pair having a key that matches the 3rd hash. Continuing with the above example, the deduplication module 118 may search, at step 528, the key-value table of the deduplication vault storage 108 to retrieve the encrypted block of the key-value pair at position 108(4) that has a key that matches the 3rd hash H118, as disclosed in FIG. 4B.

The restore phase 504 of the method 500 may include a step 530 in which the encrypted block is decrypted, using the encrypt/decrypt function, and using the 1st hash as a decryption password. Continuing with the above example, the encryption module 124 may decrypt, at step 530, the encrypted block, using the encrypt/decrypt function, and using the 1st hash H18 as a decryption password, resulting in the plain text block from position 110(2) of the source storage 110, as disclosed in FIG. 4B.

The restore phase 504 of the method 500 may include a step 532 in which the decrypted block is stored in a restore storage at the position included in the entry. Continuing with the above example, the encryption module 124 may store, at step 532, the decrypted block in the source storage 110, where the source storage 110 is functioning as a restore storage, in the position 110(2), as disclosed in FIG. 4B.

The restore phase 504 of the method 500 may include a step 534 in which it is determined whether all entries have been read from the image map. Continuing with the above example, the deduplication module 118 may determine, at step 534, whether all of the entries have been read from the image map 402, as disclosed in FIG. 4B. If it is determined at step 534 that all entries have not been read from the image map 402 (No at step 534), then the method 500 returns to step 526 where the next entry is read from the image map 402. Otherwise (Yes at step 534), the restore phase 504 of the method 500 is complete, and the method 500 proceeds to step 536 of the backup phase 506.

By the conclusion of the restore phase 504, a backup of the source storage 110 that was stored in the deduplication vault storage 108 will have been restored to a restore storage. Unlike a standard restoration, however, the restoration of the backup of the source storage 110 involves the backup remaining securely encrypted until being decrypted at the source system 104, thus reducing the potential for an unauthorized user, such as a user from Company B, to access the original plain-text blocks, except for those blocks that are included in a backup of the unauthorized user.

The backup phase 506 and the restore phase 508 of the method 500 are similar in many respects to the backup phase 502 and the restore phase 504 of the method 500, the main difference being that the backup phase 506 and the restore phase 508 are performed on the source system 106 of Company B instead of on the source system 104 of Company A.

The backup phase 506 of the method 500 may include a step 536 in which an allocated plain text block is read from the source storage. For example, the encryption module 126 may read, at step 536, the plain text block at position 112(1) or 112(2) from the source storage 112, as disclosed in FIG. 4C.

The backup phase 506 of the method 500 may include a step 538 in which the plain text block is hashed, using the same 1st cryptographic hash function used in the step 512, to generate a 4th hash. Continuing with the above example, the encryption module 126 may hash, at step 538, the plain text block from position 112(1) or 112(2) using the 1st cryptographic hash function to generate the 4th hash H47 or the 4th hash H3, as disclosed in FIG. 4C.

The backup phase 506 of the method 500 may include a step 540 in which the plain text block is encrypted, using the encrypt/decrypt function, using the 4th hash as an encryption password. Continuing with the above example, the encryption module 126 may encrypt, at step 540, the plain text block from position 112(1) using an encrypt/decrypt function, using the 4th hash H47 as an encryption password, resulting in an encrypted version of the plain text block from position 112(1), as disclosed in FIG. 4C. Similarly, the encryption module 126 may encrypt, at step 540, the plain text block from position 112(2) using the encrypt/decrypt function, using the 4th hash H3 as an encryption password, resulting in an encrypted version of the plain text block from position 110(2), as disclosed in FIG. 4C.

The backup phase 502 of the method 500 may include a step 542 in which the encrypted block is hashed, using the same 2nd cryptographic hash function used in step 516, to generate a 6th hash. Continuing with the above example, the encryption module 126 may hash, at step 542, the encrypted block corresponding to the plain text block at position 112(1) or position 112(2) using the 2nd cryptographic hash function to generate the 6th hash H147 or the 6th hash H103, respectively, as disclosed in FIG. 4C.

The backup phase 506 of the method 500 may include a step 544 in which a key-value table of a deduplication vault is searched to determine whether the 6th hash matches any key in the key-value table. Continuing with the above example, the deduplication module 118 may search, at step 544, the key-value table of the deduplication vault storage 108 to determine that the 6th hash H147 does not match any key in the key-value table, or to determine that the 6th hash H103 does match a key at position 108(2) in the key-value table, as disclosed in FIG. 4C. Upon determining that the 6th hash does not match any key in the key-value table (No at step 544), the backup phase 506 of the method 500 may include step 546. Otherwise (Yes at step 544), the backup phase 506 of the method 500 may proceed directly to step 548.

The backup phase 506 of the method 500 may include a step 546 in which a key-value pair is inserted into the key-value table with the key being the 6th hash and the value being the encrypted block. Continuing with the above example, the deduplication module 118 may insert, at step 546, a key-value pair into the key-value table at position 108(9) with the key being the 6th hash H147 and the value being the encrypted version of the plain text block 112(1), as disclosed in FIG. 4D.

The backup phase 506 of the method 500 may include a step 548 in which an entry is inserted into an image map corresponding to the source storage that includes the 4th hash, the 6th hash, and a position of the plain text block as stored in the source storage. Continuing with the above example, the deduplication module 118 may insert, at step 548, an entry into the image map 404 corresponding to the source storage 112 that includes the 4th hash H3, the 6th hash H103, and position 112(2) of the plain text block as stored in the source storage 112, as disclosed in FIG. 4C, or that includes the 4th hash H47, the 6th hash H147, and position 112(1) of the plain text block as stored in the source storage 112, as disclosed in FIG. 4D.

The backup phase 506 of the method 500 may include a step 550 in which it is determined whether all appropriate blocks to be included in the backup have been read from the source storage. Continuing with the above example, the deduplication module 118 may determine, at step 550, whether all of the allocated blocks at positions 112(1), 112(2), 112(3), and 112(5) have been read from the source storage 112, as disclosed in FIG. 4D. If it is determined at step 550 that all allocated blocks have not been read from the source storage 112 (No at step 550), then the method 500 returns to step 536 where the next allocated block is read from the source storage 112. Otherwise (Yes at step 550), the backup phase 506 of the method 500 is complete, and the method 500 proceeds to step 552 of the restore phase 508.

By the conclusion of the backup phase 506, a backup of the source storage 112 will have been stored in the deduplication vault storage 108, along with the backup of the source storage 110. Unlike a standard backup image, however, the backup of the source storage 112 as stored in the deduplication vault storage 108 has been reduced in size due to not storing multiple copies of the duplicate blocks from positions 112(2) and 112(5), as disclosed in FIG. 4D. Further, the method 500 is employed to encrypt the duplicate plain-text block from position 110(4) and position 112(2) in such a way that only a single encrypted block is stored in position 108(2) in the deduplication vault storage 108 for this duplicate block. Similarly, the method 500 is employed to encrypt the duplicate plain-text block from position 110(2) and position 112(5) in such a way that only a single encrypted block is stored in position 108(4) in the deduplication vault storage 108 for this duplicate block. Therefore, unlike standard deduplication vaults which store a single plain-text deduplicated block, or store a single plain-text block in two different encrypted forms, the method 500 disclosed herein employs client-side encryption with deduplication which enables sensitive blocks to remain secure within the deduplication vault storage 108 even while redundancy within and across the source storages 110 and 112 is reduced or eliminated.

The restore phase 508 of the method 500 may include a step 552 in which an entry is read in the image map. For example, the deduplication module 118 may read, at step 552, the first entry in the image map 404 which includes the 4th hash H3, the 6th hash H103, and source position 112(2), as disclosed in FIG. 4D.

The restore phase 508 of the method 500 may include a step 554 in which the key-value table is searched to retrieve the encrypted block of the key-value pair having a key that matches the 6th hash. Continuing with the above example, the deduplication module 118 may search, at step 554, the key-value table of the deduplication vault storage 108 to retrieve the encrypted block of the key-value pair at position 108(2) that has a key that matches the 6th hash H103, as disclosed in FIG. 4D.

The restore phase 508 of the method 500 may include a step 556 in which the encrypted block is decrypted, using the encrypt/decrypt function, and using the 4th hash as a decryption password. Continuing with the above example, the encryption module 126 may decrypt, at step 556, the encrypted block, using the encrypt/decrypt function, and using the 4th hash H3 as a decryption password, resulting in the plain text block from position 112(2) of the source storage 112, as disclosed in FIG. 4D.

The restore phase 508 of the method 500 may include a step 558 in which the decrypted block is stored in a restore storage at the position included in the entry. Continuing with the above example, the encryption module 126 may store, at step 558, the decrypted block in the source storage 112, where the source storage 112 is functioning as a restore storage, in the position 112(2), as disclosed in FIG. 4D.

The restore phase 508 of the method 500 may include a step 560 in which it is determined whether all entries have been read from the image map. Continuing with the above example, the deduplication module 118 may determine, at step 560, whether all of the entries have been read from the image map 404, as disclosed in FIG. 4D. If it is determined at step 560 that all entries have not been read from the image map 404 (No at step 560), then the method 500 returns to step 552 where the next entry is read from the image map 404. Otherwise (Yes at step 560), the restore phase 508 of the method 500 is complete.

By the conclusion of the restore phase 508, a backup of the source storage 112 that was stored in the deduplication vault storage 108 will have been restored to a restore storage. Unlike a standard restoration, however, the restoration of the backup of the source storage 112 involves the backup remaining securely encrypted until being decrypted at the source system 106, thus reducing the potential for an unauthorized user, such as a user from Company A, to access the original plain-text blocks, except for those blocks that are included in a backup of the unauthorized user.

It is understood that the foregoing discussion of the methods 300 and 500 are but two possible implementations of client-side encryption in a deduplication backup system, and various modifications are possible and contemplated. For example, these methods may be modified to remove the steps or portions of steps that involve restoring a backup to a restore storage. Further, although the methods 300 and 500 are discussed above as being performed by the deduplication module 118, the encryption module 124, and the encryption module 126, it is understood that the methods 300 and 500 may alternatively be performed by the deduplication module 118, the encryption module 124, and the encryption module 126 exclusively or by some other module or combination of modules.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for client-side encryption in a deduplication backup system, the method comprising:
   a backup phase in which the following steps are performed for each allocated plain text block stored in a client-side source storage at a point in time:
   hashing, using a first cryptographic hash function, the plain text block to generate a first hash;
   hashing, using a second cryptographic hash function, the first hash to generate a second hash;
   searching a key-value table of a deduplication storage to determine whether the second hash matches any key in the key-value table, each key-value pair in the key-value table including a key that is a hash and a value that is an encrypted block;
   upon determining that the second hash does not match any key in the key-value table, encrypting, using an encrypt/decrypt function, the plain text block using the first hash as an encryption password and inserting a key-value pair into the key-value table with the key being the second hash and the value being the encrypted block; and
   inserting an entry into an image map corresponding to the client-side source storage that includes the first hash and a position of the plain text block as stored in the client-side source storage to be subsequently used in a restore phase to restore the plain text block to the position, the entry in the image map not including the second hash, the image map being stored in a separate location from the key-value table; and
   encrypting the image map; and
   a restore phase in which each block that was stored in the client-side source storage at the point in time is restored from the deduplication storage to a restore storage, thereby recreating the state of the client-side source storage at the point in time on the restore storage.

2. The method as recited in claim 1, further comprising storing the encrypted image map in the deduplication storage.

3. The method as recited in claim 1, wherein the image map is stored in the client-side source storage.

4. The method as recited in claim 1, wherein the restore phase includes performing the following steps for each entry in the image map:
   hashing, using the second cryptographic hash function, the first hash included in the entry to generate the second hash;
   searching the key-value table to retrieve the encrypted block of the key-value pair having a key that matches the second hash;
   decrypting, using the encrypt/decrypt function, the encrypted block using the first hash as a decryption password; and
   storing the decrypted block in the restore storage at the position included in the entry.

5. The method as recited in claim 4, further comprising decrypting the image map prior to the restore phase.

6. The method as recited in claim 1, wherein each of the first cryptographic hash function and the second cryptographic hash function is one of a SHA-1, SHA-2, SHA-3, or MD5 cryptographic hash function.

7. The method as recited in claim 1, wherein the first cryptographic hash function is different from the second cryptographic hash function.

8. The method as recited in claim 1, further comprising:
   a second backup phase in which the following steps are performed for each allocated plain text block stored in a second source storage at a second point in time:
   hashing, using the first cryptographic hash function, the plain text block to generate a fourth hash;
   hashing, using the second cryptographic hash function, the fourth hash to generate a fifth hash;
   searching the key-value table to determine whether the fifth hash matches any key in the key-value table;
   upon determining that the fifth hash does not match any key in the key-value table, encrypting, using the encrypt/decrypt function, the plain text block using the fourth hash as an encryption password and inserting a key-value pair into the key-value table with the key being the fifth hash and the value being the encrypted block; and
   inserting an entry into a second image map corresponding to the second source storage that includes the fourth hash and a position of the plain text block in the second source storage and that does not include the fifth hash.

9. The method as recited in claim 8, further comprising a second restore phase in which the following steps are performed for each entry in the second image map:
   hashing, using the second cryptographic hash function, the fourth hash included in the entry to generate the fifth hash;
   searching the key-value table to retrieve the encrypted block of the key-value pair having a key that matches the fifth hash;

decrypting, using the encrypt/decrypt function, the encrypted block using the fourth hash as a decryption password; and storing the decrypted block in a second restore storage at the position included in the entry.

10. The method of claim 1, wherein instructions to perform the method are stored on one or more non-transitory computer-readable media that cause one or more processors to execute the method.

11. A method for client-side encryption in a deduplication backup system, the method comprising:
   a backup phase in which the following steps are performed for each allocated plain text block stored in a client-side source storage at a point in time:
      hashing, using a first cryptographic hash function, the plain text block to generate a first hash;
      encrypting, using an encrypt/decrypt function, the plain text block using the first hash as an encryption password;
      hashing, using a second cryptographic hash function, the encrypted block to generate a third hash;
      searching a key-value table of a deduplication storage to determine whether the third hash matches any key in the key-value table, each key-value pair in the key-value table including a key that is a hash and a value that is an encrypted block;
      upon determining that the third hash does not match any key in the key-value table, inserting a key-value pair into the key-value table with the key being the third hash and the value being the encrypted block; and
      inserting an entry into an image map corresponding to the client-side source storage that includes the first hash, the third hash, and a position of the plain text block as stored in the client-side source storage to be subsequently used in a restore phase to restore the plain text block to the position, the image map being stored in a separate location from the key-value table; and
      encrypting the image map; and
   a restore phase in which each block that was stored in the client-side source storage at the point in time is restored from the deduplication storage to a restore storage, thereby recreating the state of the client-side source storage at the point in time on the restore storage.

12. The method as recited in claim 11, further comprising storing the encrypted image map in the deduplication storage.

13. The method as recited in claim 11, wherein the image map is stored in the client-side source storage.

14. The method as recited in claim 11, wherein the restore phase includes performing the following steps for each entry in the image map:
   searching the key-value table to retrieve the encrypted block of the key-value pair having a key that matches the third hash included in the entry;
   decrypting, using the encrypt/decrypt function, the encrypted block using the first hash as a decryption password; and
   storing the decrypted block in the restore storage at the position included in the entry.

15. The method as recited in claim 14, further comprising decrypting the image map prior to the restore phase.

16. The method as recited in claim 11, wherein each of the first cryptographic hash function and the second cryptographic hash function is one of a SHA-1, SHA-2, SHA-3, or MD5 cryptographic hash function.

17. The method as recited in claim 11, wherein the first cryptographic hash function is the same as the second cryptographic hash function.

18. The method as recited in claim 11, further comprising:
   a second backup phase in which the following steps are performed for each allocated plain text block stored in a second source storage at a second point in time:
      hashing, using the first cryptographic hash function, the plain text block to generate a fourth hash;
      encrypting, using the encrypt/decrypt function, the plain text block using the fourth hash as an encryption password;
      hashing, using the second cryptographic hash function, the encrypted block to generate a sixth hash;
      searching a key-value table of the deduplication storage to determine whether the sixth hash matches any key in the key-value table;
      upon determining that the sixth hash does not match any key in the key-value table, inserting a key-value pair into the key-value table with the key being the sixth hash and the value being the encrypted block; and
      inserting an entry into a second image map corresponding to the second source storage that includes the fourth hash, the sixth hash, and a position of the plain text block as stored in the second source storage.

19. The method as recited in claim 18, further comprising a second restore phase in which the following steps are performed for each entry in the second image map:
   searching the key-value table to retrieve the encrypted block of the key-value pair having a key that matches the sixth hash included in the entry;
   decrypting, using the encrypt/decrypt function, the encrypted block using the fourth hash as a decryption password; and
   storing the decrypted block in a second restore storage at the position included in the entry.

20. The method of claim 11, wherein instructions to perform the method are stored on one or more non-transitory computer-readable media that cause one or more processors to execute the method.

* * * * *